(12) United States Patent
Son et al.

(10) Patent No.: US 11,069,958 B2
(45) Date of Patent: Jul. 20, 2021

(54) METHOD FOR RECEIVING SATELLITE SIGNAL BY ADJUSTING RESONANT FREQUENCY ACCORDING TO MEDIUM OUTSIDE ELECTRONIC DEVICE AND ELECTRONIC DEVICE SUPPORTING SAME

(71) Applicant: Samsung Electronics Co., Ltd., Suwon-si (KR)

(72) Inventors: Hyeonchang Son, Suwon-si (KR); Kyeongmun Jo, Suwon-si (KR); Seongmin Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/530,607

(22) Filed: Aug. 2, 2019

(65) Prior Publication Data
US 2020/0052387 A1 Feb. 13, 2020

(30) Foreign Application Priority Data

Aug. 7, 2018 (KR) .................. 10-2018-0092078

(51) Int. Cl.
*H01Q 1/24* (2006.01)
*H01Q 9/04* (2006.01)
(Continued)

(52) U.S. Cl.
CPC ............ *H01Q 1/244* (2013.01); *H01Q 5/328* (2015.01); *H01Q 11/02* (2013.01); *H04W 4/023* (2013.01)

(58) Field of Classification Search
CPC .......... H01Q 1/24; H01Q 1/241; H01Q 1/244; H01Q 1/273; H01Q 9/04; H01Q 9/0442; H01Q 5/321; H01Q 5/328
See application file for complete search history.

(56) References Cited

U.S. PATENT DOCUMENTS 8,638,229 B2  1/2014  Downey et al.
2014/0062816 A1  3/2014  Jo
(Continued)

FOREIGN PATENT DOCUMENTS

EP  2 128 724 A2  12/2009
EP  2 903 168 A2  8/2015
(Continued)

OTHER PUBLICATIONS

European Search Report dated Nov. 13, 2019; European Appln. No. 19190215.4-1205.
(Continued)

*Primary Examiner* — Thai Pham
(74) *Attorney, Agent, or Firm* — Jefferson IP Law, LLP

(57) ABSTRACT

An electronic device is provided. The electronic device includes a sensor, an antenna, a positioning circuit configured to receive satellite signals through the antenna using a specified frequency band, a resonant frequency adjustment circuit configured to adjust a resonant frequency of the antenna, and a processor, wherein the processor is configured to, identify whether the electronic device is in water using the sensor, when the electronic device is not in water, adjust the resonant frequency to a first frequency band specified according to a first permittivity of air in relation to the specified frequency band using the resonant frequency adjustment circuit, when the electronic device is in water, adjust the resonant frequency of the antenna to a second frequency band specified according to a second permittivity of water in relation to the specified frequency band using the resonant frequency adjustment circuit, receive the satellite signals through the antenna of which the resonant frequency has been adjusted to a frequency band corresponding to one of the first frequency band and the second frequency band using the positioning circuit; and determine a position of the
(Continued)

electronic device primarily on the basis of the received satellite signals using the positioning circuit.

20 Claims, 22 Drawing Sheets

(51) Int. Cl.
*H01Q 5/328* (2015.01)
*H01Q 11/02* (2006.01)
*H04W 4/02* (2018.01)

(56) References Cited

U.S. PATENT DOCUMENTS

| | | | | |
|---|---|---|---|---|
| 2015/0215901 | A1* | 7/2015 | Lee | H04B 1/18 455/41.2 |
| 2017/0187111 | A1* | 6/2017 | Noh | H01Q 9/42 |
| 2017/0299726 | A1 | 10/2017 | Hayashi et al. | |
| 2017/0309995 | A1 | 10/2017 | Kim et al. | |
| 2017/0310344 | A1* | 10/2017 | Lee | H04B 1/40 |
| 2018/0062249 | A1* | 3/2018 | Sung | H05K 7/1427 |

FOREIGN PATENT DOCUMENTS

| | | |
|---|---|---|
| JP | 2009-045179 A | 3/2009 |
| JP | 2017-049090 A | 3/2017 |
| JP | 2017-118171 A | 6/2017 |
| KR | 10-2014-0028520 A | 3/2014 |
| KR | 10-2016-0029539 A | 3/2016 |
| KR | 10-2017-0120790 A | 11/2017 |
| KR | 10-2018-0037556 A | 4/2018 |

OTHER PUBLICATIONS

International Search Report and Written Opinion dated Nov. 25, 2019, issued in International Patent Application No. PCT/KR2019/009656.

Intention to grant dated Nov. 20, 2020, issued in European Application No. 19190215.4.

* cited by examiner

METHOD FOR RECEIVING SATELLITE SIGNAL BY ADJUSTING RESONANT FREQUENCY ACCORDING TO MEDIUM OUTSIDE ELECTRONIC DEVICE AND ELECTRONIC DEVICE SUPPORTING SAME

CROSS-REFERENCE TO RELATED APPLICATION(S)

This application is based on and claims priority under 35 U.S.C. § 119(a) of a Korean patent application number 10-2018-0092078, filed on Aug. 7, 2018, in the Korean Intellectual Property Office, the disclosure of which is incorporated by reference herein in its entirety.

BACKGROUND

1. Field

The disclosure relates to a method for providing a position of an electronic device and an electronic device supporting the same.

2. Description of Related Art

An electronic device may measure the position thereof on the basis of signals received from satellites through an antenna. The electronic device may provide information about the measured position of the electronic device to a position-related application, such as a navigation application, a map application, a web application, or the like, thereby providing various functions related to the position.

The above information is presented as background information only to assist with an understanding of the disclosure. No determination has been made, and no assertion is made, as to whether any of the above might be applicable as prior art with regard to the disclosure.

SUMMARY

In related art, electronic devices receive signals for positioning from satellites through antennas of which the performance is optimized for operation in air. For example, electronic devices receive signals for positioning from satellites using antennas implemented to resonate at least on the basis of the permittivity (or relative permittivity) of air.

If the electronic device is in water, the resonance property (or resonant frequency) of the antenna may be varied due to the difference between the permittivity of air {e.g., about 1 F/m (farad per meter) or $C^2/m^2$} and the permittivity of water (e.g., about 80 F/m).

If the electronic device receives signals from satellites in water through an antenna implemented to resonate at least on the basis of the permittivity of air, the quality of the signal received from the satellite may be degraded. The electronic device may fail to measure the exact position thereof on the basis of the signal of low quality.

In addition, if the electronic device is in water, the signal from the satellite passes through different media (a medium of air and a medium of water) and is thus reflected, diffracted, and attenuated, so that the intensity of the signal received by the electronic device in water may be less than the intensity of the signal received in air.

Aspects of the disclosure are to address at least the above-mentioned problems and/or disadvantages and to provide at least the advantages described below. Accordingly, an aspect of the disclosure is to provide a method for providing a position of an electronic device, which is capable of producing an exact position of an electronic device by implementing an antenna optimized for operation in water, and an electronic device supporting the same.

The technical subjects pursued in the disclosure may not be limited to the above mentioned technical subjects, and other technical subjects which are not mentioned may be clearly understood, through the following descriptions, by those skilled in the art of the disclosure.

Additional aspects will be set forth in part in the description which follows and, in part, will be apparent from the description, or may be learned by practice of the presented embodiments.

In accordance with an aspect of the disclosure, an electronic device is provided. The electronic device includes a sensor, an antenna, a positioning circuit configured to receive satellite signals through the antenna using a specified frequency band, a resonant frequency adjustment circuit configured to adjust a resonant frequency of the antenna, and a processor, wherein the processor is configured to, identify whether the electronic device is in water using the sensor, when the electronic device is not in water, adjust the resonant frequency to a first frequency band specified according to a first permittivity of air in relation to the specified first frequency band using the resonant frequency adjustment circuit, when the electronic device is in water, adjust the resonant frequency of the antenna to a second frequency band specified according to a second permittivity of water in relation to the specified second frequency band using the resonant frequency adjustment circuit, receive the satellite signals through the antenna of which the resonant frequency has been adjusted to a frequency band corresponding to one of the first frequency band or the second frequency band using the positioning circuit, and determine a position of the electronic device primarily on a basis of the received satellite signals using the positioning circuit.

In accordance with another aspect of the disclosure, a method is provided. The method includes identifying whether the electronic device is in water using a sensor, when the electronic device is not in water, adjusting a resonant frequency of an antenna to a first frequency band specified according to a first permittivity of air in relation to a specified frequency band for receiving satellites signals using a resonant frequency adjustment circuit configured to adjust the resonant frequency of the antenna, when the electronic device is in water, adjusting the resonant frequency of the antenna to a second frequency band specified according to a second permittivity of water in relation to the specified second frequency band using the resonant frequency adjustment circuit, receiving the satellite signals through the antenna of which the resonant frequency has been adjusted to a frequency band corresponding to one of the first frequency band or the second frequency band using a positioning circuit, and determining a position of the electronic device primarily on a basis of the received satellite signals using the positioning circuit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
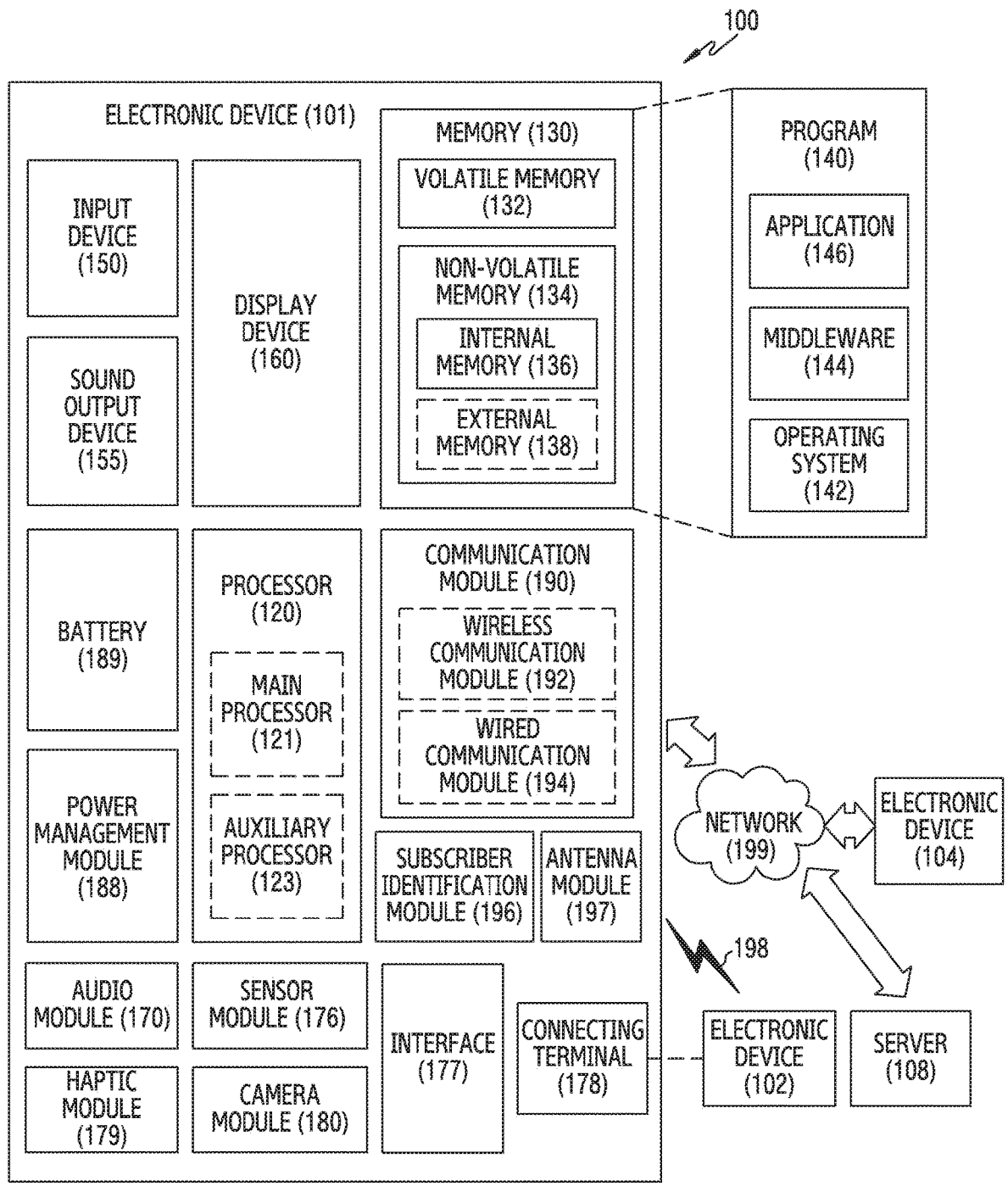
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory and/or external memory (e.g., internal memory 136 and/or external memory 138).

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
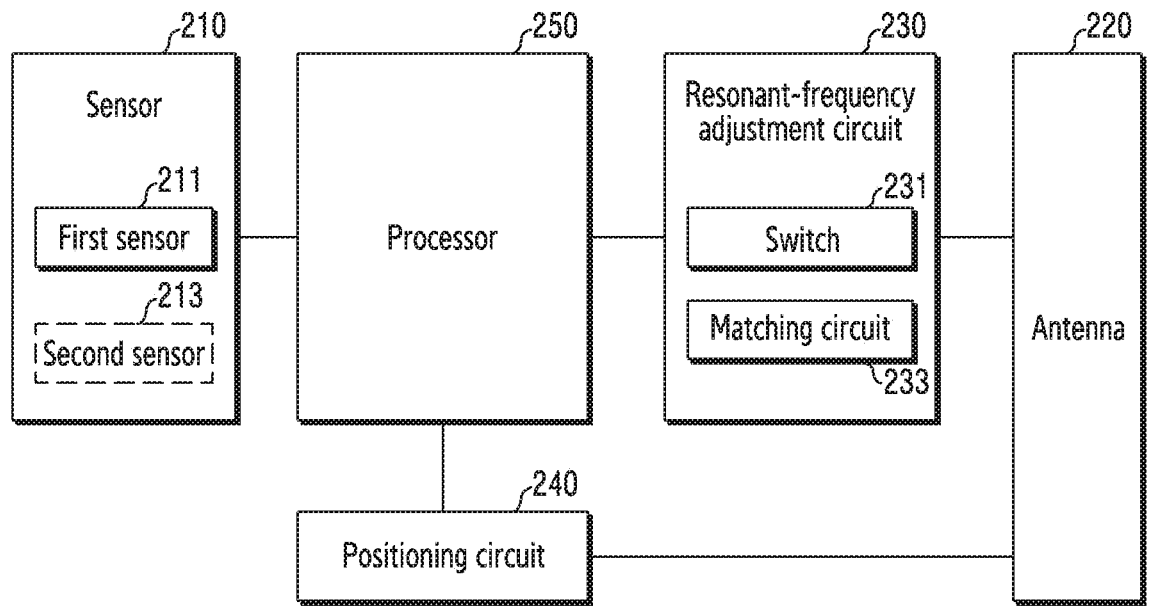
FIG. 2 is a diagram illustrating an electronic device for measuring a position of the electronic device according to an embodiment of the disclosure.

FIG. 2 is a diagram illustrating an electronic device for measuring a position according to an embodiment of the disclosure.

Referring to FIG. 2, an electronic device 101 in an embodiment may include sensor 210, an antenna 220, a resonant frequency adjustment circuit 230, a positioning circuit 240, and a processor 250.

In an embodiment, the sensor 210 may be included in the sensor module 176. In an embodiment, the sensors 201 may include at least one sensor that is not included in the sensor module 176. In an embodiment, the sensor 210 may include a first sensor 211 and a second sensor 213.

In an embodiment, the first sensor 211 may be intended to identify (or detect) whether the electronic device 101 is in water. For example, the first sensor 211 may include a sensor for identifying whether the electronic device 101 is in water or in air. The first sensor 211 may include a sensor that generates data in relation to air or water around the electronic device 101.

In an embodiment, the first sensor 211 may include at least one of an atmospheric-pressure sensor (or a barometer), a touch-sensitive sensor, a humidity sensor, or an underwater sensor.

In an embodiment, the atmospheric-pressure sensor (or a barometer) may generate data related to the atmospheric pressure of the electronic device 101 (or the atmospheric pressure around the electronic device 101). In an embodiment, the atmospheric-pressure sensor may generate data indicating an atmospheric pressure, which differs depending on whether the electronic device 101 is in air or in water. In an embodiment, the atmospheric-pressure sensor may generate data representing about 1 atmosphere (or about 101 hPa) if the electronic device 101 is in air. If the electronic device 101 is in water, the atmospheric-pressure sensor may generate data representing the data indicating an atmospheric pressure (e.g., about 106 to 107 hPa) increased by about 5 to 6 hPa, compared to the atmospheric pressure when the electronic device 101 is in air.

In an embodiment, the touch-sensitive sensor may generate data in relation to a capacitance value (or capacitance variation). In an embodiment, the touch-sensitive sensor may generate data indicating a capacitance value (or an intensity of capacitance), which differs depending on whether a user input is received by the electronic device 101 in air or in water. For example, in the case where the touch-sensitive sensor includes a capacitive sensor, there may be a difference between the capacitance value coupled from a transmission (Tx) port (or a transmission panel) to a reception (Rx) port (or a reception panel) when the capacitive sensor receives a user input in air and the capacitance value coupled from the transmission port to the reception port when the capacitive sensor receives a user input in water. In the case where the capacitance value coupled from the transmission port to the reception port is about 10 coulombs (C) when no capacitive sensor receives a user input, the capacitance value coupled from the transmission port to the reception port may be about 5 C when the capacitive sensor receives a user input in air, and the capacitance value coupled from the transmission port to the reception port may be about 0 C when the capacitive sensor receives a user input in water. Although the capacitive sensor has been described as an example of the touch-sensitive sensor for identifying whether the electronic device 101 is in water in the above embodiment, the touch-sensitive sensor is not limited thereto. For example, the touch-sensitive sensor for identifying whether the electronic device 101 is in water may encompass all kinds of sensors, such as a pressure-sensitive sensor, capable of generating different data depending on whether the electronic device 101 receives a user input in air or in water.

In an embodiment, the humidity sensor (or a hygrometer) may generate data in relation to the humidity of the electronic device 101 (or the humidity around the electronic device 101). The humidity sensor may generate data indicating the humidity, which differs depending on whether the electronic device 101 is in air or in water. In an embodiment, the humidity sensor is capable of measuring a moisture ratio in air, and may generate data indicating that the moisture ratio in air is about 100% if the electronic device 101 is in water.

In an embodiment, the underwater sensor, for example, may include a plurality of pins (or a plurality of conductors) spaced apart from each other. The underwater sensor may generate data indicating that at least two of the plurality of pins are electrically short-circuited if the electronic device 101 is in water, and may generate data indicating that the plurality of pins is not short-circuited or may not generate data related to the plurality of pins if the electronic device 101 is in air.

Although the atmospheric-pressure sensor, the touch-sensitive sensor, the humidity sensor, and the underwater sensor have been described as examples of the first sensor 211, the first sensor 211 is not limited thereto, and may encompass all kinds of sensors capable of identifying whether the electronic device 101 is in water.

In an embodiment, the first sensor 211 may transmit the generated data to the processor 250.

In an embodiment, the second sensor 213 may include a motion sensor for identifying motion of the electronic device 101 (or motion of the user wearing the electronic device 101). In an embodiment, the second sensor 213 may include at least one of an acceleration sensor (or an accelerometer) or a gyro sensor (or a gyroscope).

In an embodiment, the second sensor 213 may generate data used to determine a swimming style of the user wearing the electronic device 101. In an embodiment, if the electronic device 101 including the second sensor 213 is worn on a user's wrist, the second sensor 213 may generate data related to the rotational motion (e.g., a rotation angle or an angular velocity) of the electronic device 101, which is generated by the rotation (or a stroke or a swing) of a user's arm. For example, the second sensor 213 may generate data about an angle (or an angle variation, angular velocity, or angular acceleration) of at least one of a roll axis, a pitch axis, or a yaw axis of the electronic device 101, which is generated by the rotation of the user's arm. In another embodiment, if the electronic device 101 including the second sensor 213 is worn on a user's ankle, the motion sensor may generate data related to the motion of the electronic device 101 (or reciprocating movement of the electronic device 101), which is generated by reciprocation of a user's foot (or generated by a user's kick). In another embodiment, if the electronic device 101 including the second sensor 213 is worn on a user's head, the second sensor 213 may generate data related to the motion of the electronic device 101, which is generated by the motion of a user's head.

In an embodiment, the second sensor 213 may include at least one motion sensor. For example, the second sensor 213 may include a plurality of motion sensors that can be worn on various body parts (e.g., at least one of a wrist, an ankle, or head) of the user.

In an embodiment, the antenna 220 may receive satellite signals related to the position of the electronic device 101 from satellites. In an embodiment, the satellite signals may include GNSS signals received from at least four satellites. In an embodiment, the GNSS signal may include an upper L band (e.g., an L1 band) and a lower L band (e.g., an L5 band). The upper L band may include GPS using a frequency band of 1575.24 MHz, GLONASS using a frequency band of 1602 MHz, Beidou using a frequency band of 1561.098 MHz, and Galileo using a frequency band of 1575.42 MHz. The lower L band may include GPS and Galileo using a frequency band of 1176.45 MHz and GLONASS and Beidou using a frequency band of 1207.14 MHz.

In an embodiment, the antenna 220 may be included in the antenna module 197. In an embodiment, the antenna 220 may be implemented in a variety of ways to accurately measure the position of the electronic device 101 in water.

In an embodiment, the antenna 220 may be implemented as a scheme of including a plurality of antennas (hereinafter, referred to as a "first antenna scheme"). In an embodiment, the antenna 220 may include an antenna for measuring the position of the electronic device 101 in air (or dedicated to measurement of the position of the electronic device 101 in air) (hereinafter, referred to as a "first antenna") and an antenna for measuring the position of the electronic device 101 in water (hereinafter, referred to as a "second antenna"). In an embodiment, the length of the first antenna and the length of the second antenna may be different from each other. For example, the length of the first antenna may be greater than the length of the second antenna.

In an embodiment, the second antenna may include a plurality of second antennas. For example, the second antenna may include an antenna for receiving satellite signals using an upper L band (e.g., an L1 band) (or an upper-L-band-dedicated antenna) and an antenna for receiving satellite signals using a lower L band (e.g., an L5 band) (or a lower-L-band-dedicated antenna). As another example, the second antenna may include an antenna for measuring the position of the electronic device 101 in sea water and an antenna for measuring the position of the electronic device 101 in fresh water having a different permittivity from the sea water. Although the above example describes that the second antenna includes two antennas in, the second antenna is not limited thereto. For example, the second antenna may include three or more antennas depending on the number of bands for receiving satellite signals or depending on the permittivity of water.

In an embodiment, the antenna 220 may be implemented as a scheme of including a plurality of grounding points (or contact points with the ground) (hereinafter, referred to as a "second antenna scheme"). In an embodiment, the antenna 220 (e.g., a single antenna) may include a grounding point (hereinafter, referred to as a "first grounding point") disposed (or implemented) at the position at which the antenna has a first antenna length from a feeding point for measuring the position of the electronic device 101 in air and a grounding point (hereinafter, referred to as a "second grounding point") disposed at the position at which the antenna has a second antenna length from a feeding point for measuring the position of the electronic device 101 in water. In an embodiment, the first grounding point and the second grounding point may be arranged such that an antenna portion having a first antenna length (hereinafter, referred to as a "first antenna portion") is longer than an antenna portion having a second antenna length (hereinafter, referred to as a "second antenna portion"). Although the antenna has been illustrated as including two grounding points in the above example, the antenna is not limited thereto. For example, the antenna may include three or more grounding points depending on the number of bands for receiving satellite signals or depending on the permittivity of water.

In an embodiment, the antenna 220 (e.g., a single antenna) may be implemented as a scheme in which the antenna is connected to one of a plurality of matching circuits having different impedances from each other through one grounding point (hereinafter, referred to as a "third antenna scheme"). In an embodiment, the antenna 220 may be connected to a matching circuit used to measure the position of the electronic device 101 in air or a matching circuit used to measure the position of the electronic device 101 in water. Although the antenna has been illustrated as being connected to one of the two matching circuits in the above example, it is not limited thereto. For example, the antenna may be connected to one matching circuit corresponding to the number of bands for receiving satellite signals or the permittivity of water, among three or more matching circuits having different impedances from each other.

In an embodiment, the resonant frequency adjustment circuit 230 may adjust the resonant frequency of the antenna 220. In an embodiment, the resonant frequency adjustment circuit 230 may adjust the resonant frequency of the antenna 220 to a frequency band specified according to the permittivity of a medium (e.g., air or water) in relation to a specified frequency band for receiving the satellite signals.

In an embodiment, if the electronic device 101 is in air, the resonant frequency adjustment circuit 230 may adjust the resonant frequency of the antenna 220 to a frequency band specified according to the permittivity of air (hereinafter, referred to as a "first frequency band") in relation to a specified frequency band for receiving the satellite signals (e.g., GNSS signals) primarily on the basis of the permittivity of air (e.g., about 1 F/m).

In an embodiment, if the electronic device 101 is in water, the resonant frequency adjustment circuit 230 may adjust the resonant frequency of the antenna 220 to a frequency band specified according to the permittivity of water (hereinafter, referred to as a "second frequency band") in relation to a specified frequency band for receiving the satellite signals (e.g., GNSS signals) primarily on the basis of the permittivity of water (e.g., about 80 F/m).

In an embodiment, the first frequency band and the second frequency band may be frequency bands defined on the basis of (or on the assumption that) the electronic device 101 is in air. For example, the resonant frequency of the antenna 220, which is measured in the state in which the electronic device 101 is in water after adjusting the resonant frequency of the antenna 220 to the second frequency band while the electronic device 101 is in air, may be equal to the first frequency band.

In an embodiment, since the resonant frequency of the antenna 220 measured in water may be less than the resonant frequency of the antenna measured in air with respect to the same antenna 220 due to the difference in the permittivity (or difference in the medium) between air and water, the second frequency band may be greater than the first frequency band.

In an embodiment, the resonant frequency adjustment circuit 230 may include a switch 231 and a matching circuit 233.

In an embodiment, if the antenna 220 is implemented as a first antenna scheme, the switch 231 may be connected to the antenna selected from the first antenna and the second antenna under the control of the processor 250 (or according to a control signal received from the processor 250). In an embodiment, if the antenna 220 is implemented as the first antenna scheme, the matching circuit 233 may include a matching circuit for matching the impedance of the first antenna and a matching circuit for matching the impedance of the second antenna. For example, the matching circuit for matching the impedance of the first antenna may be configured to match the impedance of a radio-frequency (RF)-front module of the electronic device 101 in the first frequency band (or the input impedance of the first antenna) and the impedance of the first antenna. In an embodiment, the matching circuit 233 may include at least one of a capacitor or an inductor. In an embodiment, the matching circuit 233 may allow the antenna to resonate in the frequency band for receiving satellite signals by employing the RF-front module of the electronic device 101 and a configuration (e.g., a variable capacitor) for changing the imaginary component of the impedance of the antenna. In an embodiment, if the antenna 220 is implemented as a second antenna scheme, the switch 231 may be connected to the grounding point selected from the first grounding point and the second grounding point of the antenna 220 under the control of the processor 250. In an embodiment, if the antenna 220 is implemented as the second antenna scheme, the matching circuit 233 may include a matching circuit for matching the impedance of a first antenna portion having a length from a feeding point to the first grounding point and a matching circuit for matching the impedance of a second antenna portion having a length from the feeding point to the second grounding point.

In an embodiment, if the antenna 220 is implemented as a third antenna scheme, the switch 231 may be connected to one of the plurality of matching circuits through a single grounding point of the antenna under the control of the processor 250. In an embodiment, if the antenna 220 is implemented as the third antenna scheme, the matching circuit 233 may include a plurality of matching circuits that are connected to the ground and are selectively connected to the antenna 220 by a switching operation of the switch 231.

In an embodiment, the resonant frequency adjustment circuit 230 may be included in a radio-frequency (RF)-front module of the electronic device 101. In an embodiment, the RF-front module of the electronic device 101 may further include a filter (e.g., a GNSS surface acoustic wave filter, a GNSS low-noise amplifier, and the like).

In an embodiment, the positioning circuit 240 may receive satellite signals through the antenna 220 (or the feeding point of the antenna 220). The positioning circuit 240 may process the received satellite signals, and may transmit the processed satellite signals to the processor 250. In an embodiment, the positioning circuit 240 may include a GNSS communication module.

In an embodiment, the processor 250 may control the overall operations of providing the position of the electronic device 101 primarily on the basis of the satellite signals received through the antenna. In an embodiment, the processor 250 may be included in the processor 120. In an embodiment, a secondary processor (e.g., the auxiliary processor 123) (or a sensor hub or a sensor processor) included in the processor 250 may perform an operation of providing the position of the electronic device 101 by replacing the processor 250 or by interworking with the processor 250.

In an embodiment, the processor 250 may obtain data from the first sensor 211 in order to determine whether the electronic device 101 is in water or in air. For example, the processor 250 may obtain data in relation to the atmospheric pressure of the electronic device 101 (or the atmospheric pressure around the electronic device 101) from the atmospheric-pressure sensor. As another example, the processor 250 may obtain data related to a capacitance value from the touch-sensitive sensor. As another example, the processor 250 may obtain data related to the humidity of the electronic device 101 from the humidity sensor. As another example, the processor 250 may obtain, from the underwater sensor, data related to a short circuit between at least two of a plurality of pins included in the underwater sensor. In an embodiment, the processor 250 may obtain, from at least one of an atmospheric-pressure sensor, a touch-sensitive sensor, a humidity sensor, or an underwater sensor included in the first sensor 211, data to determine whether the electronic device 101 is in water or in air.

In an embodiment, the processor 250 may determine whether the electronic device 101 is in water primarily on the basis of the data obtained from the first sensor 211.

In an embodiment, the processor 250 may determine whether the electronic device 101 is in water primarily on the basis of the data obtained from the atmospheric-pressure sensor. For example, if the data obtained from the atmospheric-pressure sensor represents 1 atmosphere (or about 101 hPa), the processor 250 may determine that the electronic device 101 is in air. If the data obtained from the atmospheric-pressure sensor represents an atmospheric pressure (e.g., about 106 to 107 hPa), which is increased by about 5 to 6 hPa, compared to the case where the electronic device 101 is in air, the processor 250 may determine that the electronic device 101 is in water.

In an embodiment, the processor 250 may identify whether the electronic device 101 is in water primarily on the basis of the data obtained from the touch-sensitive sensor. For example, if a capacitance value obtained from the touch-sensitive sensor and coupled from the transmission port to the reception port is about 5 C, the processor 250 may determine that the electronic device 101 is in air. If a capacitance value obtained from the touch-sensitive sensor and coupled from the transmission port to the reception port is about 0 C, the processor 250 may determine that the electronic device 101 is in water. In an embodiment, if a capacitance value obtained from the touch-sensitive sensor and coupled from the transmission port to the reception port is maintained to be about 0 C for a specified period of time, the processor 250 may determine that the electronic device 101 is in water. In an embodiment, if the area of the reception port, in which the capacitance value obtained from the touch-sensitive sensor and coupled from the transmission port to the reception port represents (or is measured to be) about 0 C, is equal to or greater than a specified area, the processor 250 may determine that the electronic device 101 is in water.

In an embodiment, the processor 250 may identify whether the electronic device 101 is in water primarily on the basis of the data obtained from the humidity sensor. For example, if the data obtained from the humidity sensor indicates that the moisture percentage in air is less than a specified value, the processor 250 may determine that the electronic device 101 is in air. If the data obtained from the humidity sensor indicates that the moisture percentage in air is equal to or greater than a specified value (e.g., if the moisture percentage in air is about 100%), the processor 250 may determine that the electronic device 101 is in water.

In an embodiment, the processor 250 may identify whether the electronic device 101 is in water primarily on the basis of the data obtained from the underwater sensor. For example, if the data obtained from the underwater sensor indicates that at least two of a plurality of pins included in the underwater sensor are electrically short-circuited, the processor 250 may determine that the electronic device 101 is in water. If the data obtained from the underwater sensor indicates that at least two of the plurality of pins included in the underwater sensor are not electrically short-circuited, the processor 250 may determine that the electronic device 101 is in air. In an embodiment, if no data is obtained data from the underwater sensor, the processor 250 may determine that the electronic device 101 is in air.

In an embodiment, the processor 250 may execute an application related to the position of the electronic device 101 before obtaining the data from the first sensor 211. For example, the processor 250 may execute an application for measuring the position of the electronic device 101, a navigation application, a map application, or a web application before obtaining the data from the first sensor 211. In an embodiment, the processor 250 may execute an application related to the position of the electronic device 101 while obtaining the data from the first sensor 211 or after obtaining the data from the first sensor 211. If the processor 250 executes an application related to the position of the electronic device 101 while obtaining the data from the first sensor 211 or after obtaining the data from the first sensor 211, the processor 250 may obtain data from the first sensor 211 even after the execution of the application related to the position of the electronic device 101.

In an embodiment, the processor 250 may identify whether the electronic device 101 is located in a sea or in a river (or a lake). For example, the processor 250 may identify whether the latitude and longitude of the electronic device 101 correspond to the position information of a sea or a river using an application related to the position of the electronic device 101, thereby determining whether the electronic device 101 is located in a sea or in a river (or a lake). In an embodiment, the operation of identifying whether the electronic device 101 is located in a sea or in a river (or a lake) may be performed before performing the operation of identifying whether the electronic device 101 is in water primarily on the basis of the data obtained from the first sensor 211. For example, the processor 250 may measure the position of the electronic device 101 using the first antenna, and may identify whether the measured position of the electronic device 101 corresponds to the position of a sea or a river using an application related to the position of the electronic device 101 before (or immediately before) the processor 250 performs the operation of identifying whether the electronic device 101 is in water primarily on the basis of the data obtained from the first sensor 211. In an embodiment, the position of the electronic device 101, which is used to identify whether the electronic device 101 is located in a sea or in a river (or a lake), may be the one that is most recently (or lastly) measured through the first antenna before the processor 250 performs the operation of identifying whether the electronic device 101 is in water primarily on the basis of the data obtained from the first sensor 211.

In an embodiment, the processor 250 may identify whether the electronic device 101 is located in sea water or in fresh water primarily on the basis of the data obtained from the first sensor 211 and information on whether the electronic device 101 is located in a sea or in a river. For example, if the data obtained from the first sensor 211 indicates that the electronic device 101 is in water, and if the information on whether the electronic device 101 is located in a sea or in a river indicates that the electronic device 101 is located in a sea, the processor 250 may determine that the electronic device 101 is in sea water. As another example, if the data obtained from the first sensor 211 indicates that the electronic device 101 is in water, and if the information on whether the electronic device 101 is located in a sea or in a river indicates that the electronic device 101 is located in a river, the processor 250 may determine that the electronic device 101 is in fresh water.

In an embodiment, if the processor 250 identifies that the electronic device 101 is in air, the processor 250 may adjust the resonant frequency of the antenna 220 to a first frequency band specified according to a first permittivity of air using the resonant frequency adjustment circuit 230. For example, if the antenna 220 is implemented as a first antenna scheme, the processor 250 may control a switching operation of the switch 231 such that the switch 231 is connected to a matching circuit that is connected to the first antenna and is intended to match the impedance of the first antenna. As another example, if the antenna 220 is implemented as a second antenna scheme, the processor 250 may control a switching operation of the switch 231 such that the switch 231 is connected to a matching circuit that is connected to the first grounding point and is intended to match the impedance of the antenna 220. As another example, if the antenna 220 is implemented as a third antenna scheme, the processor 250 may control a switching operation of the switch 231 such that the switch 231 is connected to a matching circuit 233 that is connected to the antenna 220 and the ground and is used to measure the position of the electronic device 101 in air.

In an embodiment, if the processor 250 identifies that the electronic device 101 is in air, the processor 250 may adjust the resonant frequency of the antenna 220 to a first frequency band.

In an embodiment, if the processor 250 identifies that the electronic device 101 is not in air (or that the electronic device 101 is in water), the processor 250 may adjust the resonant frequency of the antenna 220 to a second frequency band specified according to a second permittivity of water using the resonant frequency adjustment circuit 230. For example, if the antenna 220 is implemented as a first antenna scheme, the processor 250 may control a switching operation of the switch 231 such that the switch 231 is connected to a matching circuit that is connected to the second antenna and is intended to match the impedance of the second antenna. As another example, if the antenna 220 is implemented as a second antenna scheme, the processor 250 may control a switching operation of the switch 231 such that the switch 231 is connected to a matching circuit that is connected to the second grounding point and is intended to match the impedance of the antenna. As another example, if the antenna 220 is implemented as a third antenna scheme, the processor 250 may control a switching operation of the switch 231 such that the switch 231 is connected to a matching circuit that is connected to the antenna 220 and the ground and is used to measure the position of the electronic device 101 in water.

In an embodiment, if the processor 250 identifies that the electronic device 101 is in water, the processor 250 may adjust the resonant frequency of the antenna to the second frequency band in water.

In an embodiment, if the processor 250 identifies that the electronic device 101 is in sea water, the processor 250 may adjust the resonant frequency of the antenna 220 to the frequency band specified according to the permittivity of sea water using the resonant frequency adjustment circuit 230.

In an embodiment, if the processor 250 identifies that the electronic device 101 is in fresh water, the processor 250 may adjust the resonant frequency of the antenna 220 to the frequency band specified according to the permittivity of fresh water using the resonant frequency adjustment circuit 230.

In an embodiment, the operation in which the processor 250 identifies that the electronic device 101 is in sea water or in fresh water and adjusts the resonant frequency of the antenna 220 to the frequency band specified according to the permittivity of sea water or fresh water using the resonant frequency adjustment circuit 230 may be similar to the operation in which the processor 250 identifies that the electronic device 101 is in water and adjusts the resonant frequency of the antenna to the second frequency band specified according to the second permittivity of water using the resonant frequency adjustment circuit 230.

In an embodiment, if satellite signals are received through the antenna 220, the processor 250 may determine (or measure or produce) the position of the electronic device 101 primarily on the basis of the received satellite signals. In an embodiment, the processor 250 may determine the position of the electronic device 101 primarily on the basis of the satellite signals using a variety of methods, such as point positioning, relative positioning, and the like. However, a method of determining the position of the electronic device 101 is not limited thereto.

In an embodiment, the processor 250 may include a configuration (or a module) for measuring the position of the electronic device 101 primarily on the basis of the satellite signals. In an embodiment, the configuration for measuring the position of the electronic device 101 primarily on the basis of the satellite signals may be provided in the electronic device 101 independently from the processor 250.

Although FIG. 2 illustrates that the processor 250 identifies whether the electronic device 101 is in water primarily on the basis of the data received from the first sensor 211, the processor 250 may perform the operation of adjusting the resonant frequency of the antenna 220 primarily on the basis of a user input. For example, in response to reception of a first user input for measuring the position of the electronic device 101 in air (or reception of a first user input representing a user's intention to measure the position of the electronic device 101 in air), the processor 250 may adjust the resonant frequency of the antenna 220 to the first frequency band. As another example, in response to reception of a second user input for measuring the position of the electronic device 101 in water (or reception of a second user input representing a user's intention to measure the position of the electronic device 101 in water), the processor 250 may adjust the resonant frequency of the antenna 220 to the second frequency band.

In an embodiment, in the case where the processor 250 performs the operation of adjusting the resonant frequency of the antenna 220 primarily on the basis of a user input, it is possible to omit at least one of the operation in which the processor 250 generates data, the operation in which the processor 250 obtains data from the first sensor 211, or the operation in which the processor 250 identifies whether the electronic device 101 is in water primarily on the basis of the obtained data.

In an embodiment, in the case where the processor 250 performs the operation of adjusting the resonant frequency of the antenna 220 primarily on the basis of a user input, the processor 250 may receive satellite signals using the positioning circuit 240 through the antenna 220 of which the resonant frequency has been adjusted to the specified frequency band, and may determine the position of the electronic device 101 primarily on the basis of the received satellite signals.

In an embodiment, the processor 250 may determine a swimming style primarily on the basis of information obtained from the second sensor 213.

In an embodiment, if the electronic device 101 is worn on a user's wrist, the processor 250 may determine whether the swimming style is breaststroke, front crawl, backstroke, or butterfly stroke primarily on the basis of the data related to the rotational motion of the electronic device 101 caused by the rotation of the user's arm, which is obtained from the second sensor 213. For example, the processor 250 may compare the data obtained from the second sensor 213 with specified swimming style-related data (or data pattern) stored in the memory 130. If the data obtained from the second sensor 213 corresponds to the specified swimming style-related data, the processor 250 may determine the swimming style of the user of the electronic device 101 to be the swimming style corresponding to the specified swimming style-related data (or the swimming style indicated by the specified swimming style-related data).

In an embodiment, if the electronic device 101 including the second sensor 213 is worn on at least one of a user's ankle or wrist, as well as a user's head, the processor 250 may determine whether the swimming style is breaststroke, front crawl, backstroke, or butterfly stroke primarily on the basis of the data related to the rotational motion of the electronic device 101 caused by the rotation of the user's arm and at least one piece of data related to the motion of the electronic device 101 caused by the reciprocating motion of a foot or data related to the motion of the electronic device 101 caused by the motion of the user's head.

Although breaststroke, front crawl, backstroke, and butterfly stroke have been illustrated as swimming styles in the above example, the swimming style is not limited thereto. For example, the processor 250 may determine other swimming styles, in addition to breaststroke, front crawl, backstroke, and butterfly stroke, primarily on the basis of the data obtained from the second sensor 213.

In an embodiment, the processor 250 may configure the mode of the antenna 220 according to the determined swimming style.

In an embodiment, if the processor 250 determines that the user's swimming style is breaststroke, the processor 250 may configure an antenna mode (hereinafter, referred to as a "first antenna mode") in which the position of the electronic device 101 is constantly (or fixedly) measured for a specified period of time using the antenna 220 of which the resonant frequency has been adjusted to the second frequency band. In an embodiment, if the user swims the breaststroke with the electronic device 101 worn on the user's wrist, the electronic device 101 may remain in water while the user is swimming.

In an embodiment, if the processor 250 determines that the user's swimming style is front crawl, backstroke, or butterfly stroke, the processor 250 may configure an antenna mode (hereinafter, referred to as a "second antenna mode") in which the position of the electronic device 101 is measured using the antenna 220 of which the resonant frequency is alternately adjusted to the first frequency band and the second frequency band. In an embodiment, if the user swims the front crawl, backstroke, or butterfly stroke with the electronic device 101 worn on the user's wrist, the electronic device 101 may be alternately positioned in water and in air while the user is swimming. In an embodiment, if the user swims the front crawl, backstroke, or butterfly stroke with the electronic device 101 worn on the user's wrist, the time during which the electronic device 101 is in air may be the same as the time during which the electronic device 101 is in water while the user is swimming.

In an embodiment, the processor 250 may adjust the resonant frequency of the antenna 220 to correspond to the configured antenna mode.

In an embodiment, the processor 250 may configure a period in which the processor 250 identifies whether the electronic device 101 is in water according to (or to correspond to) the configured antenna mode.

In an embodiment, if the antenna mode is configured as the first antenna mode, the processor 250 may control the resonant frequency adjustment circuit 230 such that the resonant frequency of the antenna 220 is maintained to be the second frequency band for a specified period of time.

In an embodiment, if the antenna mode is configured as the first antenna mode, the processor 250 may identify whether the electronic device 101 is in water for a period equal to or greater than a specified time period. In an embodiment, if the antenna mode is configured as the first antenna mode, the first sensor 211 may generate data for identifying whether the electronic device 101 is in water for a period equal to or greater than a specified time period (or at a sampling rate equal to or less than a specified sampling rate). In an embodiment, if the antenna mode is configured as the first antenna mode, the processor 250 may obtain, from the first sensor 211, data for identifying whether the electronic device 101 is in water for a period equal to or greater than a specified time period. In an embodiment, if the antenna mode is configured as the first antenna mode, the processor 250 may identify whether the electronic device 101 is in water for a period equal to or greater than a specified time period primarily on the basis of the data obtained from the first sensor 211.

In an embodiment, if the antenna mode is configured as the first antenna mode, the processor 250 may identify whether the electronic device 101 is in water for a period equal to or greater than a specified time period, and may adjust the resonant frequency of the antenna 220 to a first frequency band or a second frequency band depending on whether the electronic device 101 is in air or in water.

In an embodiment, if the antenna mode is configured as a second antenna mode, the processor 250 may alternately adjust the resonant frequency of the antenna 220 to a first frequency band and a second frequency band.

In an embodiment, if the antenna mode is configured as the second antenna mode, the processor 250 may identify whether the electronic device 101 is in water for a period less than a specified time period. In an embodiment, if the antenna mode is configured as the second antenna mode, the first sensor 211 may generate data for identifying whether the electronic device 101 is in water for a period less than a specified time period (or at a sampling rate greater than a specified sampling rate). In an embodiment, if the antenna mode is configured as the second antenna mode, the processor 250 may obtain data, from the first sensor 211, for identifying whether the electronic device 101 is in water for a period less than a specified time period. In an embodiment, if the antenna mode is configured as the second antenna mode, the processor 250 may identify whether the electronic device 101 is in water for a period less than a specified time period primarily on the basis of the data obtained from the first sensor 211.

In an embodiment, if the antenna mode is configured as the second antenna mode, the processor 250 may identify whether the electronic device 101 is in water for a period less than a specified time period, and may adjust the resonant frequency of the antenna 220 to a first frequency band or a second frequency band depending on whether the electronic device 101 is in air or in water.

In an embodiment, the processor 250 may receive satellite signals through the antenna 220 of which the resonant frequency has been adjusted. For example, if the positioning circuit 240 receives satellite signals through the antenna 220 of which the resonant frequency has been adjusted, the processor 250 may receive the satellite signals from the positioning circuit 240.

In an embodiment, the processor 250 may determine the position of the electronic device 101 on the basis of the received satellite signals.

In an embodiment, FIG. 2 illustrates that the processor 250 determines the swimming style primarily on the basis of the data obtained from the second sensor 213 and configures the antenna mode according to the determined swimming style, but the processor 250 may configure the mode of the antenna 220 primarily on the basis of a user input.

In an embodiment, if the processor 250 configures the mode of the antenna 220 primarily on the basis of a user input, it is possible to omit the operation in which the second sensor 213 generates data related to a swimming style and the operation in which the processor 250 determines a swimming style primarily on the basis of the swimming style-related data received from the second sensor 213.

In an embodiment, the user input for determining the antenna mode may include an input for selecting at least one of breaststroke, front crawl, backstroke, or butterfly stroke or an input for selecting a first antenna mode or a second antenna mode.

In an embodiment, if the antenna mode is configured primarily on the basis of the user input, the processor 250 may adjust the resonant frequency of the antenna 220 to correspond to the configured antenna mode. In an embodiment, the processor 250 may receive satellite signals through the antenna 220 of which the resonant frequency has been adjusted, and may determine the position of the electronic device 101 primarily on the basis of the received satellite signals.

In an embodiment, the electronic device 101 may measure the position of the electronic device 101 using the first antenna mode or the second antenna mode according to the swimming styles, thereby reducing power consumption and resources of the electronic device 101, compared to the case of measuring the position of the electronic device 101 without considering the swimming styles.

In an embodiment, although not shown in FIG. 2, the electronic device 101 may further include at least some of the elements of the electronic device 101 shown in FIG. 1. For example, the electronic device 101 may further include the display 160 for displaying the determined position of the electronic device 101, the communication module 190 (e.g., a cellular communication module) for transmitting the determined position of the electronic device 101, and the like.

Figure 3A:
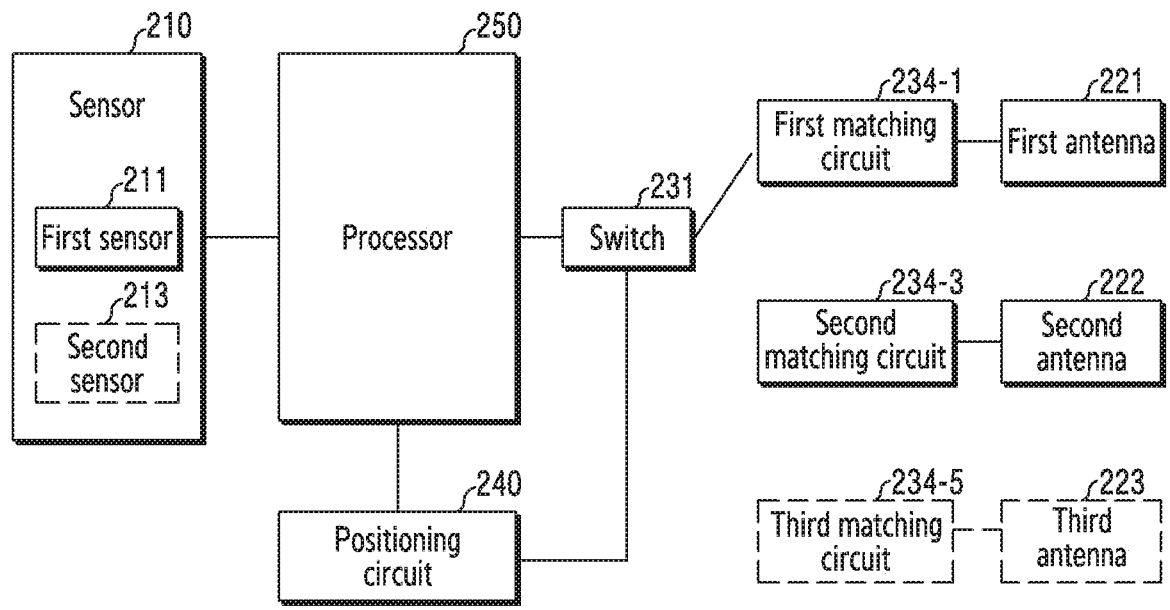
FIG. 3A is a diagram illustrating an electronic device for measuring a position of the electronic device using a plurality of antennas according to an embodiment of the disclosure.

FIG. 3A is a diagram illustrating an electronic device for measuring a position of the electronic device using a plurality of antennas according to an embodiment of the disclosure.

Figure 3B:
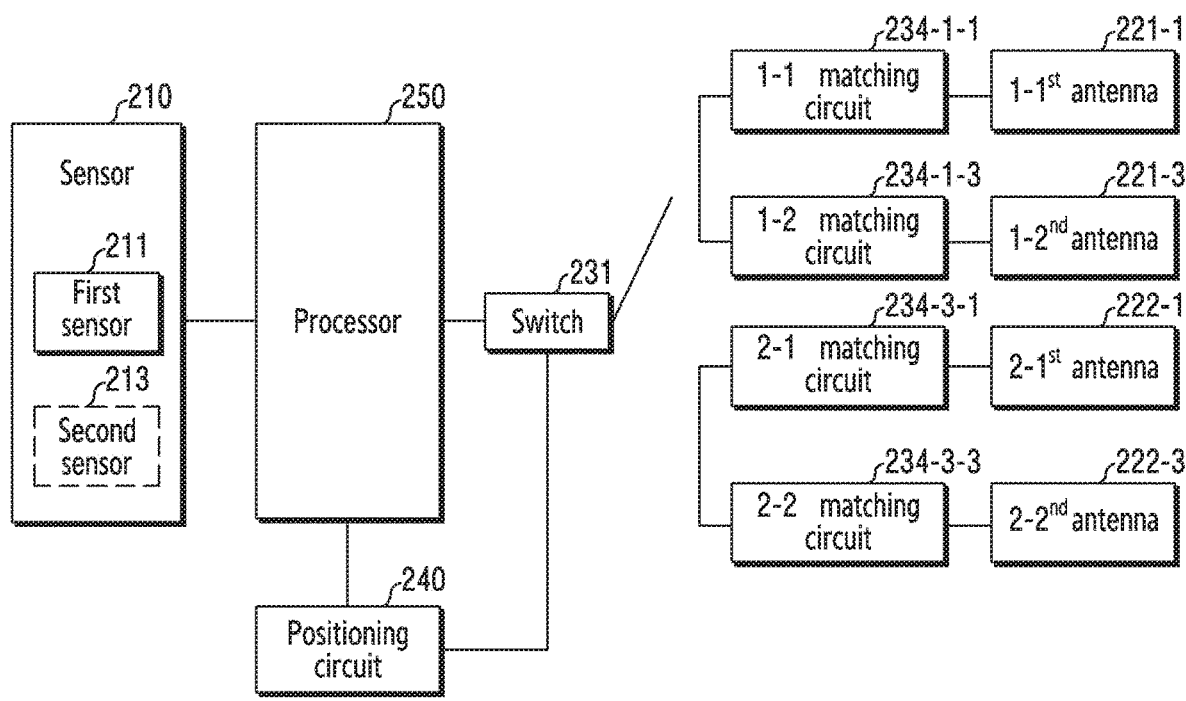
FIG. 3B is a diagram illustrating an electronic device for measuring a position of the electronic device using a plurality of antennas according to an embodiment of the disclosure.
Figure 3C:
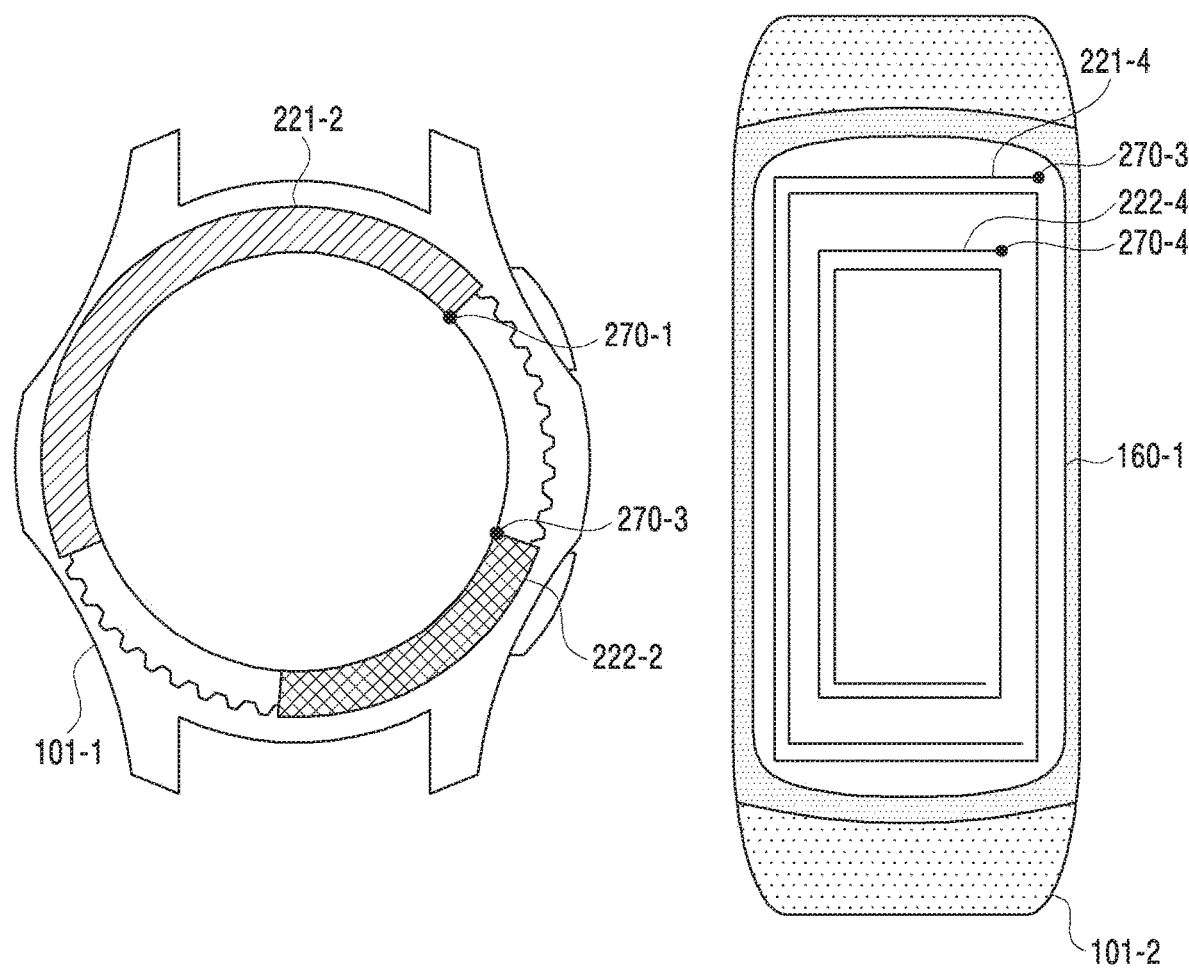
FIG. 3C is a diagram illustrating an electronic device for measuring a position of the electronic device using a plurality of antennas according to an embodiment of the disclosure.

FIG. 3B is a diagram illustrating an electronic device for measuring a position of the electronic device 101 using a plurality of antennas according to an embodiment of the disclosure. FIG. 3C is a diagram illustrating an electronic device 101 for measuring the position of an electronic device 101 using a plurality of antennas according to an embodiment of the disclosure.

FIGS. 3A to 3C may be diagrams illustrating an electronic device for measuring a position of the electronic device using a first antenna scheme.

Referring to FIG. 3A, the electronic device 101 may include a sensor 210, a first antenna 221, a second antenna 222, a third antenna 223, a first matching circuit 234-1, a second matching circuit 234-3, a third matching circuit 234-5, a switch 231, a positioning circuit 240, and a processor 250.

In an embodiment, the sensor 210 in FIG. 3A may be the same as the sensor 210 in FIG. 2. In an embodiment, the first antenna 221, the second antenna 222, and the third antenna 223 may be included in the antenna 220 in FIG. 2. The first matching circuit 234-1, the second matching circuit 234-3, and the third matching circuit 234-5 in FIG. 3A may be included in the matching circuit 233 in FIG. 2. In an embodiment, the switch 231, the positioning circuit 240, and the processor 250 in FIG. 3A may be the same as the switch 231, the positioning circuit 240, and the processor 250 in FIG. 2, respectively. In an embodiment, the first matching circuit 234-1, the second matching circuit 234-3, the third matching circuit 234-5, and the switch 231 may be included in the resonant frequency adjustment circuit 230 in FIG. 2.

In an embodiment, the first antenna 221 may be intended to measure the position of the electronic device 101 in air (or may be dedicated to measurement of the position of the electronic device 101 in air), and the second antenna 222 and the third antenna 223 may be intended to measure the position of the electronic device 101 in water. In an embodiment, the second antenna 222 may be intended to measure the position of the electronic device 101 in sea water, and the third antenna 223 may be intended to measure the position of the electronic device 101 in fresh water. In an embodiment, the electronic device 101 may not include the third antenna 223 and the third matching circuit 234-5 connected to the third antenna 223.

In an embodiment, the first antenna 221, the second antenna 222, or the third antenna 223 may transmit satellite signals to the positioning circuit 240.

In an embodiment, the first matching circuit 234-1 may adjust the resonant frequency of the first antenna 221 to a first frequency band specified according to the permittivity of air. In an embodiment, the first matching circuit 234-1 may be connected to the first antenna 221.

In an embodiment, the second matching circuit 234-3 may adjust the resonant frequency of the second antenna 222 to a second frequency band specified according to the permittivity of sea water. In an embodiment, the second matching circuit 234-3 may be connected to the second antenna 222.

In an embodiment, the third matching circuit 234-5 may adjust the resonant frequency of the third antenna 223 to a second frequency band specified according to the permittivity of fresh water. In an embodiment, the third matching circuit 234-5 may be connected to the third antenna 223.

In an embodiment, the switch 231 may be connected to the first matching circuit 234-1, the second matching circuit 234-3, or the third matching circuit 234-5 depending on whether the electronic device 101 is in air, in sea water, or in fresh water under the control of the processor 250 (or according to a control signal received from the processor 250). For example, if it is identified that the electronic device 101 is in air, the switch 231 may be connected to the first matching circuit 234-1 primarily on the basis of a signal received from the processor 250. As another example, if it is identified that the electronic device 101 is in sea water, the switch 231 may be connected to the second matching circuit 234-3 primarily on the basis of a signal received from the processor 250. As another example, if it is identified that the electronic device 101 is in fresh water, the switch 231 may be connected to the third matching circuit 234-5 primarily on the basis of a signal received from the processor 250.

In an embodiment, if the switch 231 is connected to the first matching circuit 234-1, the satellite signals received through the first antenna 221 may be transmitted to the positioning circuit 240.

In an embodiment, if the switch 231 is connected to the second matching circuit 234-3, the satellite signals received through the second antenna 222 may be transmitted to the positioning circuit 240.

In an embodiment, if the switch 231 is connected to the third matching circuit 234-5, the satellite signals received through the third antenna 223 may be transmitted to the positioning circuit 240.

In an embodiment, the positioning circuit 240 may receive satellite signals through antennas (e.g., the first antenna 221, the second antenna 222, or the third antenna 223) (or feeding points of the antennas). The positioning circuit 240 may process the received satellite signals, and may transmit the processed satellite signals to the processor 250.

In an embodiment, the processor 250 may determine the position of the electronic device 101 primarily on the basis of the satellite signals received from the positioning circuit 240.

Referring to FIG. 3B, in an embodiment, the electronic device 101 may include a sensor 210, a $1\text{-}1^{st}$ antenna 221-1, a $1\text{-}2^{nd}$ antenna 221-3, a $2\text{-}1^{st}$ antenna 222-1, a $2\text{-}2^{nd}$ antenna 222-3, a $1\text{-}1^{st}$ matching circuit 234-1-1, a $1\text{-}2^{nd}$ matching circuit 234-1-3, a $2\text{-}1^{st}$ matching circuit 234-3-1, a $2\text{-}2^{nd}$ matching circuit 234-3-3, a switch 231, a positioning circuit 240, and a processor 250.

In an embodiment, the sensor 210, the switch 231, the positioning circuit 240, and the processor 250 in FIG. 3B may be the same as the sensor 210, the switch 231, the positioning circuit 240, and the processor 250 in FIG. 3A, respectively. In an embodiment, the $1\text{-}1^{st}$ antenna 221-1 and the $1\text{-}2^{nd}$ antenna 221-3 may be included in the first sensor 211 in FIG. 3A. In an embodiment, the $2\text{-}1^{st}$ antenna 222-1 and the $2\text{-}2^{nd}$ antenna 222-3 may be included in the second antenna 222 in FIG. 3A. In an embodiment, the $1\text{-}1^{st}$ matching circuit 234-1-1 and the $1\text{-}2^{nd}$ matching circuit 234-1-3 may be included in the first matching circuit 234-1 in FIG. 3A. In an embodiment, the $2\text{-}1^{st}$ matching circuit 234-3-1 and the $2\text{-}2^{nd}$ matching circuit 234-3-3 may be included in the second matching circuit 234-3 in FIG. 3A.

In an embodiment, the $1\text{-}1^{st}$ matching circuit 234-1-1, the $1\text{-}2^{nd}$ matching circuit 234-1-3, the $2\text{-}1^{st}$ matching circuit 234-3-1, the $2\text{-}2^{nd}$ matching circuit 234-3-3, and the switch 231 may be included in the resonant frequency adjustment circuit 230 in FIG. 2.

In an embodiment, the $1\text{-}1^{st}$ antenna 221-1 and the $1\text{-}2^{nd}$ antenna 221-3 may be intended to measure the position of the electronic device 101 in air (or may be dedicated to measurement of the position of the electronic device 101 in air), and the $2\text{-}1^{st}$ antenna 222-1 and the $2\text{-}2^{nd}$ antenna 222-3 may be intended to measure the position of the electronic device 101 in water.

In an embodiment, the $1\text{-}1^{st}$ antenna 221-1 and the $2\text{-}1^{st}$ antenna 222-1 may be intended to receive satellite signals through an upper L band (e.g., an L1 band) of a GNSS signal, and the $1\text{-}2^{nd}$ antenna 221-3 and the $2\text{-}2^{nd}$ antenna 222-3 may be intended to receive satellite signals through a lower L band (e.g., an L5 band) of a GNSS signal.

In an embodiment, the $1\text{-}1^{st}$ matching circuit 234-1-1 may adjust the resonant frequency of the $1\text{-}1^{st}$ antenna 221-1 to a $1\text{-}1^{st}$ frequency band specified according to the permittivity of air such that the antenna resonates with respect to the upper L band. In an embodiment, the $1\text{-}1^{st}$ matching circuit 234-1-1 may be connected to the $1\text{-}1^{st}$ antenna 221-1.

In an embodiment, the $1\text{-}2^{nd}$ matching circuit 234-1-3 may adjust the resonant frequency of the $1\text{-}2^{nd}$ antenna 221-3 to a $1\text{-}2^{nd}$ frequency band specified according to the permittivity of air such that the antenna resonates with respect to the lower L band. In an embodiment, the $1\text{-}2^{nd}$ matching circuit 234-1-3 may be connected to the $1\text{-}2^{nd}$ antenna 221-3.

In an embodiment, the $2\text{-}1^{st}$ matching circuit 234-3-1 may adjust the resonant frequency of the $2\text{-}1^{st}$ antenna 222-1 to a $2\text{-}1^{st}$ frequency band specified according to the permittivity of water such that the antenna resonates with respect to the upper L band. In an embodiment, the $2\text{-}1^{st}$ matching circuit 234-3-1 may be connected to the $2\text{-}1^{st}$ antenna 222-1.

In the embodiment, the $2\text{-}2^{nd}$ matching circuit 234-3-3 may adjust the resonant frequency of the $2\text{-}2^{nd}$ antenna 222-3 to a $2\text{-}2^{nd}$ frequency band specified according to the permittivity of water such that the antenna resonates with respect to the lower L band. In an embodiment, the $2\text{-}2^{nd}$ matching circuit 234-3-3 may be connected to the $2\text{-}2^{nd}$ antenna 222-3.

In an embodiment, the switch 231 may be connected to the $1\text{-}1^{st}$ matching circuit 234-1-1 and the $1\text{-}2^{nd}$ matching circuit 234-1-3, or the $2\text{-}1^{st}$ matching circuit 234-3-1 and the $2\text{-}2^{nd}$ matching circuit 234-3-3 depending on whether the electronic device 101 is in air or in water under control of the processor 250 (or according to a control signal received from the processor 250). For example, if it is identified that the electronic device 101 is in air, the switch 231 may be connected to the $1\text{-}1^{st}$ matching circuit 234-1-1 and the $1\text{-}2^{nd}$ matching circuit 234-1-3 primarily on the basis of the signals received from the processor 250. As another example, if it is identified that the electronic device 101 is in water, the switch 231 may be connected to the $2\text{-}1^{st}$ matching circuit 234-3-1 and the $2\text{-}2^{nd}$ matching circuit 234-3-3 primarily on the basis of the signals received from the processor 250.

In an embodiment, if the switch 231 is connected to the $1\text{-}1^{st}$ matching circuit 234-1-1 and the $1\text{-}2^{nd}$ matching circuit 234-1-3, satellite signals of the upper L band and lower band received through the 1-1$^{st}$ antenna 221-1 and the 1-2$^{nd}$ antenna 221-3 may be transmitted to the positioning circuit 240.

In an embodiment, if the switch 231 is connected to the 2-1$^{st}$ matching circuit 234-3-1 and the 2-2$^{nd}$ matching circuit 234-3-3, satellite signals of the upper L band and lower band received through the 2-1$^{st}$ antenna 222-1 and the 2-2$^{nd}$ antenna 222-3 may be transmitted to the positioning circuit 240.

In an embodiment, the positioning circuit 240 may receive satellite signals through antennas (e.g., the 1-1$^{st}$ antenna 221-1 and the 1-2$^{nd}$ antenna 221-3 or the 2-1$^{st}$ antenna 222-1 and the 2-2$^{nd}$ antenna 222-3). The positioning circuit 240 may process the received satellite signals, and may transmit the processed satellite signals to the processor 250.

In an embodiment, the processor 250 may determine the position of the electronic device 101 primarily on the basis of the satellite signals received from the positioning circuit 240.

In an embodiment, the processor 250 may determine the position of the electronic device 101 using the satellite signals of the upper L band and lower band, thereby determining the position of the electronic device 101 accurately, compared to the case of determining the position of the electronic device 101 using one of the upper L band and the lower band. For example, the processor 250 may determine the position of the electronic device 101 using the satellite signals of the upper L band, and may correct the position of the electronic device 101, which is determined using the satellite signals of the upper L band, using the satellite signals of the lower band.

In an embodiment, FIG. 3C is a diagram showing electronic devices 101-1 and 101-2 for measuring a position using a plurality of antennas. In an embodiment, the electronic devices 101-1 and 101-2 may be included in the electronic device 101 in FIG. 1.

Referring to FIG. 3C, in an embodiment, the electronic device 101-1 may be a wearable device configured as a watch, and the electronic device 101-2 may be a wearable device configured as a band in FIG. 3C. However, the types of the electronic devices are not limited to the wearable devices. For example, the electronic device 101 may include a device that is not wearable on the user's body, such as a smart phone.

In an embodiment, the electronic device 101-1 may include a first antenna 221-2 and a second antenna 222-2. In an embodiment, the first antenna 221-2 may be longer than the second antenna 222-2.

In an embodiment, the first antenna 221-2 and the second antenna 222-2 may transmit satellite signals to the positioning circuit 240 through a feeding point 270-1 and a feeding point 270-3, respectively.

In an embodiment, the first antenna 221-2 and the second antenna 222-2 may include at least a part of a housing of the electronic device 101 (or a bezel of the electronic device 101).

In an embodiment, the electronic device 101-2 may include a first antenna 221-4 and a second antenna 222-4. In an embodiment, the first antenna 221-4 may be longer than the second antenna 222-4.

In an embodiment, the first antenna 221-4 and the second antenna 222-4 may transmit satellite signals to the positioning circuit 240 through a feeding point 270-3 and a feeding point 270-4, respectively.

In an embodiment, the first antenna 221-4 and the second antenna 222-4 of the electronic device 101-2 may be provided inside a display 160-1 that is the same as the display 160 in FIG. 1. For example, the first antenna 221-4 and the second antenna 222-4 may be interposed between a glass exposed to the outside of the electronic device 101-2 and a touch circuit (or a touch panel). In an embodiment, the first antenna 221-4 and the second antenna 222-4 may be configured as a transparent metal sheet having conductivity.

Figure 4A:
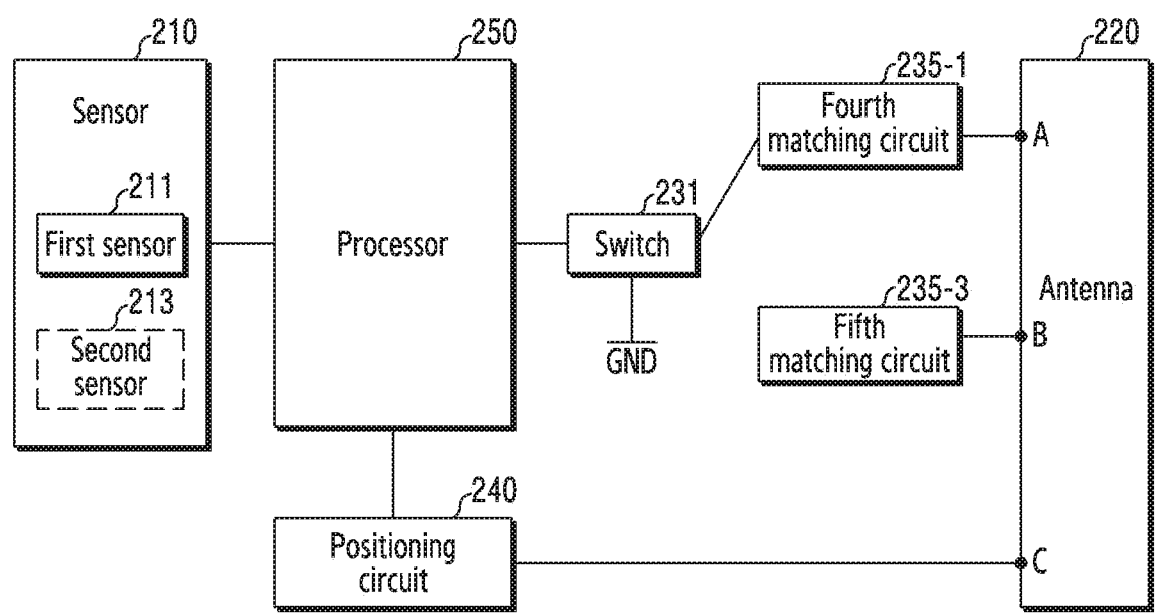
FIG. 4A is a diagram illustrating an electronic device for measuring a position of the electronic device using a plurality of grounding points of an antenna according to an embodiment of the disclosure.

FIG. 4A is a diagram illustrating an electronic device for measuring the position of the electronic device using a plurality of grounding points of an antenna according to an embodiment of the disclosure.

Figure 4B:
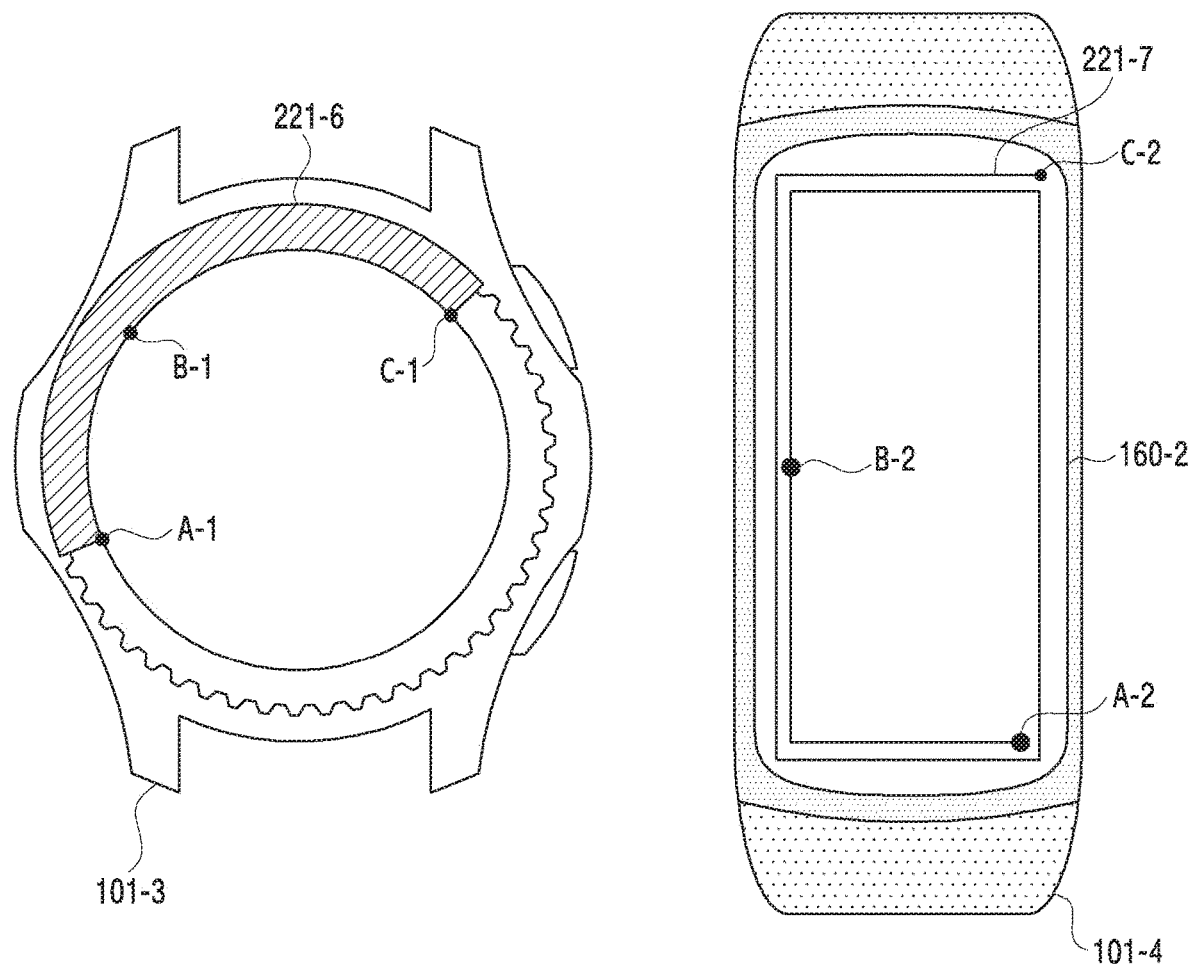
FIG. 4B is a diagram illustrating an electronic device for measuring a position of the electronic device using a plurality of grounding points of an antenna according to an embodiment of the disclosure.

FIG. 4B is a diagram illustrating an electronic device for measuring a position of the electronic device 101 using a plurality of grounding points of an antenna according to an embodiment of the disclosure.

FIGS. 4A and 4B may be diagrams illustrating an electronic device 101 for measuring the position of the electronic device 101 using a second antenna scheme.

Referring to FIGS. 4A and 4B, the electronic device 101 may include a sensor 210, an antenna 220, a fourth matching circuit 235-1, a fifth matching circuit 235-3, a switch 231, a positioning circuit 240, and a processor 250.

In an embodiment, the antenna 220 in FIG. 4A may be the same as the first antenna 220 in FIG. 3A. In an embodiment, the fourth matching circuit 235-1 and the fifth matching circuit 235-3 in FIG. 4A may be included in the matching circuit 233 in FIG. 2. In an embodiment, the fourth matching circuit 235-1, the fifth matching circuit 235-3, and the switch 231 may be included in the resonant frequency adjustment circuit 230 in FIG. 2.

In an embodiment, the antenna 220 may include a first grounding point (A) disposed at the position at which the antenna has a first antenna length from a feeding point (C) to measure the position of the electronic device 101 in air and a second grounding point (B) disposed at the position at which the antenna has a second antenna length from the feeding point (C) to measure the position of the electronic device 101 in water. In an embodiment, the first grounding point (A) and the second grounding point (A) of the antenna 220 may be disposed such that a first antenna portion having the first antenna length is longer than a second antenna portion having the second antenna length.

In an embodiment, the antenna 220 may transmit satellite signals to the positioning circuit 240 through the feeding point (C).

In an embodiment, the fourth matching circuit 235-1 may adjust the resonant frequency of the first antenna 220 to a first frequency band specified according to the permittivity of air. In an embodiment, the fourth matching circuit 235-1 may be connected to the first antenna 220 through the first grounding point (A).

In an embodiment, the fifth matching circuit 235-3 may adjust the resonant frequency of the second antenna 220 to a second frequency band specified according to the permittivity of water. In an embodiment, the fifth matching circuit 235-3 may be connected to the antenna 220 through the second grounding point (B).

In an embodiment, the switch 231 may be connected to the fourth matching circuit 235-1 or the fifth matching circuit 235-3 depending on whether the electronic device 101 is in air or in water under the control of the processor 250 (or according to a control signal received from the processor 250). For example, if it is identified that the electronic device 101 is in air, the switch 231 may be connected to the fourth matching circuit 235-1 primarily on the basis of signals received from the processor 250. If the switch 231 connected to the ground is connected to the fourth matching circuit 235-1, the antenna 220 connected to the fourth matching circuit 235-1 through the first grounding point (A) may be grounded (or may be connected to the ground). As another example, if it is identified that the electronic device 101 is in water, the switch 231 may be connected to the fifth matching circuit 235-3 primarily on the basis of signals received from the processor 250. If the switch 231 connected to the ground is connected to the fifth matching circuit 235-3, the antenna 220 connected to the fifth matching circuit 235-3 through the second grounding point (B) may be grounded (or may be connected to the ground).

A detailed description of the sensor 210, the positioning circuit 240, and the processor 250 in FIG. 4A is the same as that in FIG. 2 above, which will be omitted.

In an embodiment, FIG. 4B is a diagram illustrating electronic devices 101-3 and 101-4 for measuring a position using a plurality of grounding points of an antenna.

In an embodiment, the electronic device 101-3 may be a wearable device configured as a watch, and the electronic device 101-4 may be a wearable device configured as a band in FIG. 4B.

In an embodiment, an antenna 221-6 of the electronic device 101-3 may include a first grounding point (A-1) disposed at the position at which the antenna has a first antenna length from a feeding point (C-1) to measure the position of the electronic device 101-3 in air and a second grounding point (B-1) disposed at the position as which the antenna has a second antenna length from the feeding point (C-1) to measure the position of the electronic device 101-3 in water.

In an embodiment, the antenna 221-6 may include at least a part of a housing of the electronic device 101-3.

In an embodiment, the antenna 221-6 may transmit satellite signals to the positioning circuit 240 through the feeding point (C-1).

In an embodiment, an antenna 221-7 of the electronic device 101-4 may include a first grounding point (A-2) disposed at the position at which the antenna has a first antenna length from a feeding point (C-2) to measure the position of the electronic device 101-4 in air and a second grounding point (B-2) disposed at the position at which the antenna has a second antenna length from the feeding point (C-2) to measure the position of the electronic device 101-4 in water.

In an embodiment, the antenna 221-7 of the electronic device 101-4 may be provided inside a display 160-2 that is the same as the display 160 in FIG. 1. For example, the antenna 221-7 may be interposed between a glass and a touch circuit (or a touch panel). In an embodiment, the antenna 221-7 may be configured as a transparent metal sheet having conductivity.

In an embodiment, the antenna 221-7 of the electronic device 101-4 may transmit satellite signals to the positioning circuit 240 through the feeding point (C-2).

Figure 5A:
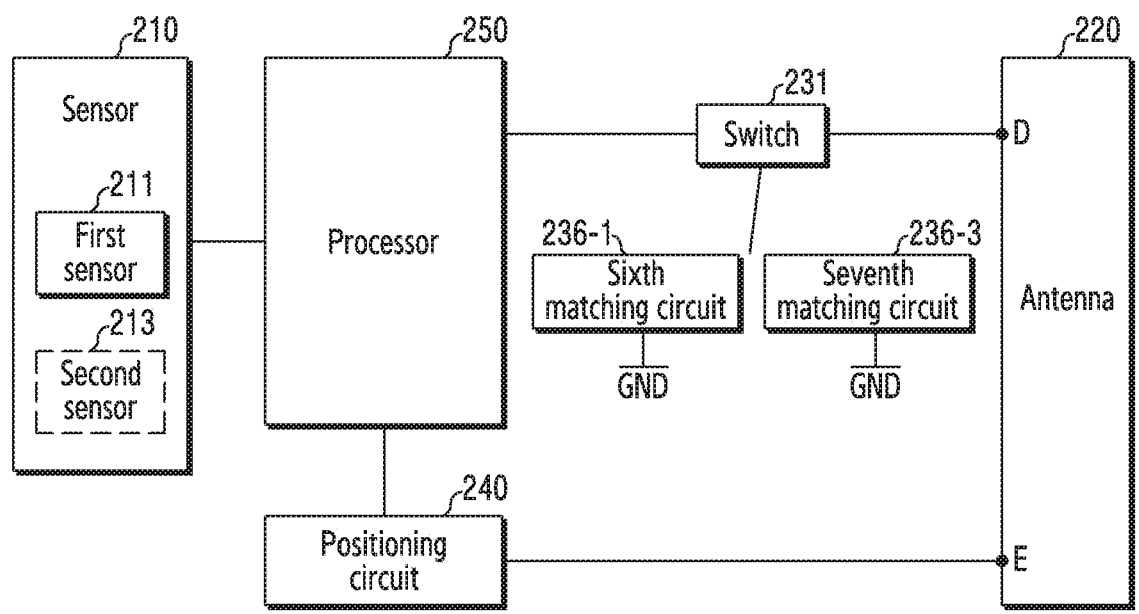
FIG. 5A is a diagram illustrating an electronic device for measuring a position of an electronic device using a plurality of matching circuits having different impedances from each other and connected through one grounding point of an antenna according to an embodiment of the disclosure.

FIG. 5A is a diagram illustrating an electronic device for measuring a position of the electronic device using a plurality of matching circuits having different impedances from each other and connected through one grounding point of an antenna according to an embodiment of the disclosure.

Figure 5B:
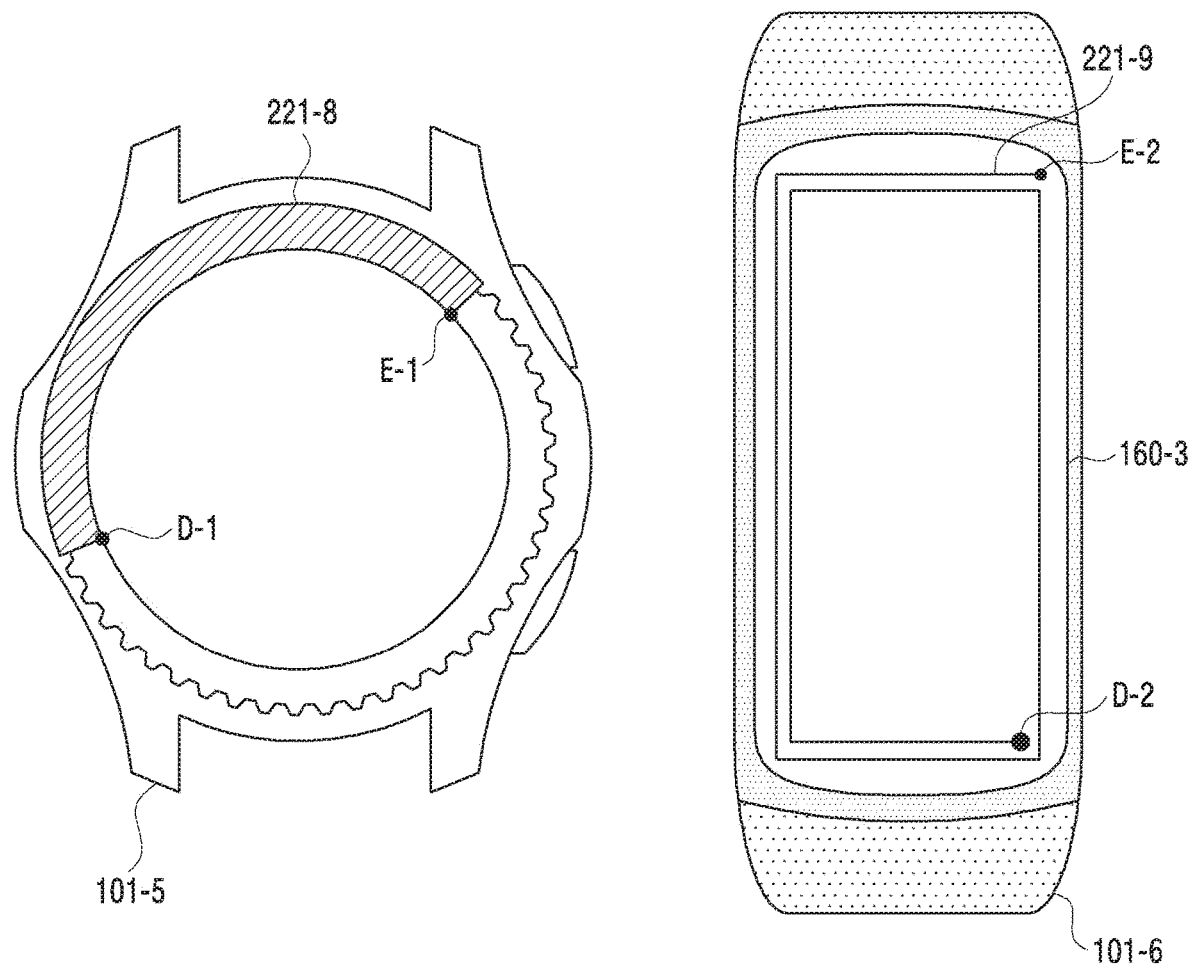
FIG. 5B is a diagram illustrating an electronic device for measuring a position of the electronic device using a plurality of matching circuits having different impedances from each other and connected through one grounding point of an antenna according to an embodiment of the disclosure.

FIG. 5B is a diagram illustrating an electronic device for measuring a position of the electronic device using a plurality of matching circuits having different impedances from each other and connected through one grounding point of an antenna according to an embodiment of the disclosure.

FIGS. 5A and 5B may be diagrams showing an electronic device 101 for measuring the position of the electronic device 101 using a third antenna scheme.

Referring to FIGS. 5A and 5B, in an embodiment, the electronic device 101 may include a sensor 210, an antenna 220, a sixth matching circuit 236-1, a seventh matching circuit 236-3, a switch 231, a positioning circuit 240, and a processor 250 in FIG. 5A.

In an embodiment, the antenna 220 in FIG. 5A may be the same as the first antenna 220 in FIG. 3A. In an embodiment, the sixth matching circuit 236-1 and the seventh matching circuit 236-3 in FIG. 5A may be included in the matching circuit 233 in FIG. 2. In an embodiment, the sixth matching circuit 236-1, the seventh matching circuit 236-3, and the switch 231 may be included in the resonant frequency adjustment circuit 230 in FIG. 2.

In an embodiment, the antenna 220 may be connected to the switch 231 through a grounding point (D). In an embodiment, the antenna 220 may transmit satellite signals to the positioning circuit 240 through a feeding point (E).

In an embodiment, the sixth matching circuit 236-1 may adjust the resonant frequency of the first antenna 220 to a first frequency band specified according to the permittivity of air. In an embodiment, the sixth matching circuit 236-1 may be connected to the ground.

In an embodiment, the seventh matching circuit 236-3 may adjust the resonant frequency of the second antenna 220 to a second frequency band specified according to the permittivity of water. In an embodiment, the seventh matching circuit 236-3 may be connected to the ground.

In an embodiment, the switch 231 may be connected to the sixth matching circuit 236-1 or the seventh matching circuit 236-3 depending on whether the electronic device 101 is in air or in water under the control of the processor 250. For example, if it is identified that the electronic device 101 is in air, the switch 231 may be connected to the sixth matching circuit 236-1 primarily on the basis of signals received from the processor 250. If the switch 231 is connected to the sixth matching circuit 236-1 that is connected to the ground, the antenna 220 connected to the sixth matching circuit 236-1 through the grounding point (D) may be grounded. As another example, if it is identified that the electronic device 101 is in water, the switch 231 may be connected to the seventh matching circuit primarily on the basis of signals received from the processor 250. If the switch 231 is connected to the seventh matching circuit 236-3 that is connected to the ground, the antenna 220 connected to the seventh matching circuit 236-3 through the grounding point (D) may be grounded.

A detailed description of the sensor, the positioning circuit 240, and the processor 250 in FIG. 5A is the same as that in FIG. 2 above, which will be omitted.

In an embodiment, FIG. 5B is a diagram illustrating electronic devices 101-5 and 101-6 for measuring a position using a plurality of grounding points of an antenna and a plurality of matching circuits having different impedances from each other and connected through one grounding point of an antenna.

In an embodiment, the electronic device 101-5 may be a wearable device configured as a watch, and the electronic device 101-6 may be a wearable device configured as a band in FIG. 5B.

In an embodiment, an antenna 221-8 of the electronic device 101-5 may be connected to a sixth matching circuit (e.g., the sixth matching circuit 236-1) or a seventh matching circuit (e.g., the seventh matching circuit 236-3), which is connected to the ground through a grounding point (D-1).

In an embodiment, the antenna 221-8 may include as at least a part of a housing of the electronic device.

In an embodiment, the antenna 221-8 may transmit satellite signals to the positioning circuit 240 through a feeding point (E-1).

In an embodiment, an antenna 221-9 of the electronic device 101-6 may be connected to a sixth matching circuit (e.g., the sixth matching circuit 236-1) or a seventh matching circuit (e.g., the seventh matching circuit 236-3), which is connected to the ground through a grounding point (D-2).

In an embodiment, the antenna 221-9 of the electronic device 101-6 may be provided inside a display 160-3 that is the same as the display 160 in FIG. 1. For example, the antenna 221-9 may be interposed between a glass and a touch circuit (or a touch panel). In an embodiment, the antenna 221-9 may be configured as a transparent metal sheet having conductivity.

In an embodiment, the antenna 221-9 of the electronic device 101-6 may transmit satellite signals to the positioning circuit 240 through a feeding point (E-2).

Figure 6:
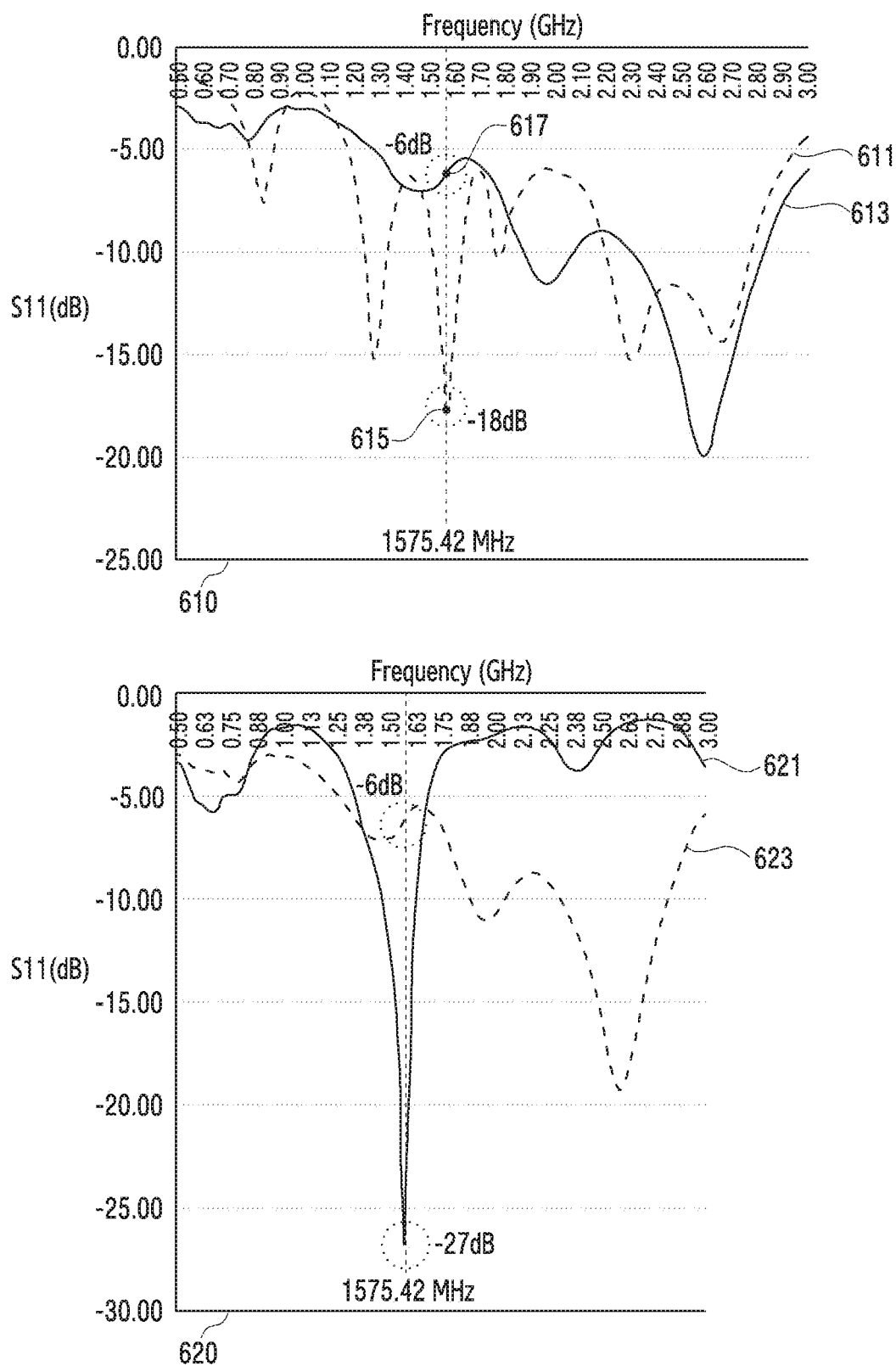
FIG. 6 is a diagram illustrating experimental results in relation to resonant frequency adjustment of an antenna according to an embodiment of the disclosure.

FIG. 6 is a diagram illustrating experimental results in relation to resonant frequency adjustment of an antenna according to an embodiment of the disclosure.

Referring to FIG. 6, in an embodiment, a graph 610 shows a curve 611 of an S-parameter (S11) measured in the state in which the electronic device 101 is in air and an S-parameter curve 613 measured in the state in which the electronic device 101 is in water using the first antenna 221 for measuring the position of the electronic device 101 in air (or first antenna 221 dedicated to measurement of the position of the electronic device 101 in air).

In an embodiment, the graph 610 shows that the S-parameter is measured to be about −18 dB in the frequency band of the S-parameter curve 611 at point 615, which is the same as the first frequency band (e.g., 1572.42 MHz). Therefore, it can be seen that the first antenna 221 resonates in the first frequency band while the electronic device 101 is in air. In an embodiment, the graph 610 shows that the S-parameter is measured to be about −6 dB in the frequency band of the S-parameter curve 613 at point 617, which is the same as the first frequency band. Therefore, it can be seen that the performance of the first antenna 221 is degraded while the electronic device 101 is in water.

In an embodiment, a graph 620 shows an S-parameter curve 621 measured in the state in which the electronic device 101 is in water and an S-parameter curve 623 measured in the state in which the electronic device 101 is in water using the second antenna 222 for measuring the position of the electronic device 101 in water. The S-parameter curve 623 may be the same as the S-parameter curve 613.

In an embodiment, the graph 620 shows that the S-parameter is measured to be about −27 dB in the frequency band (e.g., 1572.42 MHz) of the S-parameter curve 621 corresponding to the second frequency band (or the S-parameter curve obtained by measuring the resonant frequency of the antenna in water, of which the resonant frequency has been adjusted to the second frequency band in air). Therefore, it can be seen that the second antenna 222 resonates while the electronic device 101 is in water.

According to the experimental results in FIG. 6, it can be confirmed that the performance of the antenna is improved by measuring the position of the electronic device 101 through the second antenna 222 by replacing the first antenna 221 (or by switching a connection from the first antenna 221 to the second antenna 222) if the electronic device 101 is in water.

Although FIG. 6 illustrates the experimental results in relation to the first antenna scheme through the first antenna 221 and the second antenna 222, the disclosure is not limited thereto, and experimental results related to the second antenna scheme or the third antenna scheme may be the same as or similar to the experimental results in FIGS. 5A and 5B.

Figure 7:
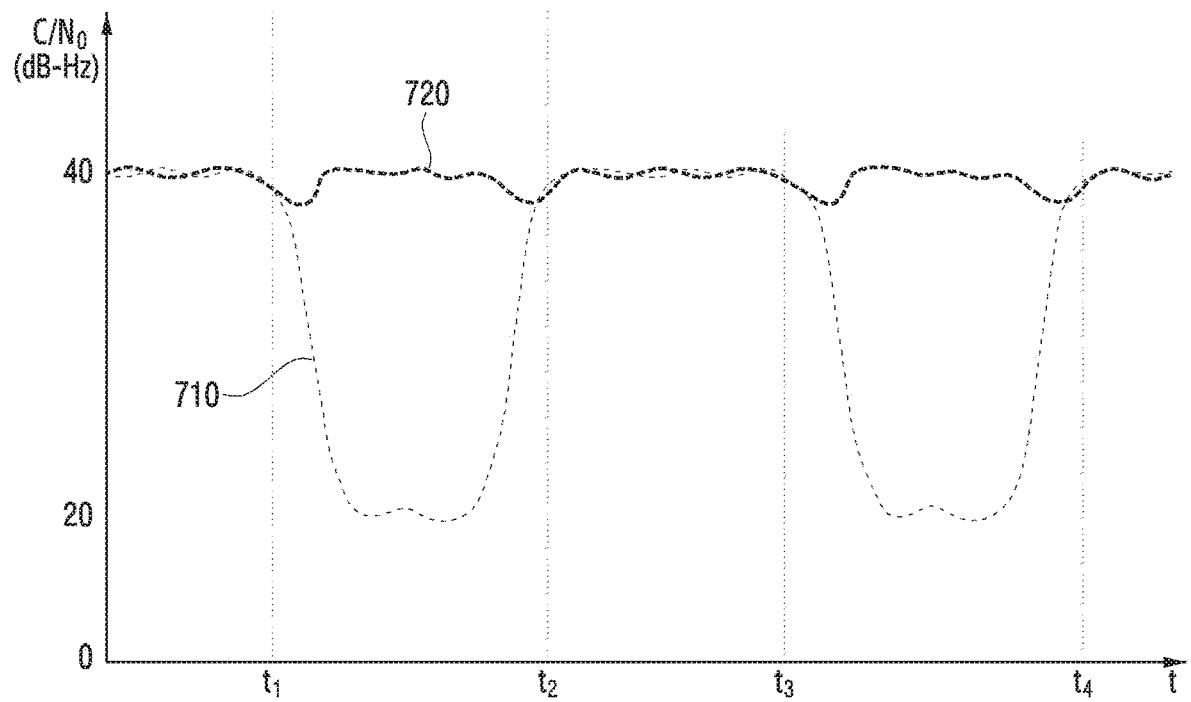
FIG. 7 is a diagram illustrating experimental results in relation to antenna modes according to an embodiment of the disclosure.

FIG. 7 is a diagram illustrating experimental results in relation to antenna modes according to an embodiment of the disclosure.

Referring to FIG. 7, in an embodiment, a graph 700 shows a variation curve 710 of carrier-to-noise density ($C/N_0$) of a GNSS signal when measuring the position of the electronic device 101 using only the first antenna 221 (or in the state in which the resonant frequency of the antenna is adjusted to a first frequency band) and a variation curve 720 of $C/N_0$ of a GNSS signal when measuring the position of the electronic device 101 in the second antenna mode in the case where the swimming style is front crawl, backstroke, or butterfly stroke.

In an embodiment, in the graph 700, the electronic device 101 may be in air in the time interval from 0 to $t_1$ and the time interval from $t_2$ to $t_3$, and the electronic device 101 may be in water in the time interval from $t_1$ to $t_2$ and the time interval from $t_3$ to $t_4$.

In an embodiment, according to the variation curve 710 of $C/N_0$ of a GNSS signal, the $C/N_0$ of a GNSS signal is measured to be about 20 dB-Hz in the time intervals in which the electronic device 101 is in water (the time interval from $t_1$ to $t_2$ and the time interval from $t_3$ to $t_4$) when measuring the position of the electronic device 101 using only the first antenna 221, so that the processor 250 may receive satellite signals of low quality.

In an embodiment, according to the variation curve 720 of $C/N_0$ of a GNSS signal, the $C/N_0$ of a GNSS signal is measured to be constant regardless of the time intervals in which the electronic device 101 is in air or in water when measuring the position of the electronic device 101 using the second antenna mode, so that the processor 250 may receive satellite signals of high quality.

In an embodiment, if the swimming style is front crawl, backstroke, or butterfly stroke, the electronic device 101 may measure the position of the electronic device 101 using the second antenna mode, thereby stably measuring the position of the electronic device 101.

An electronic device according to various embodiments may include: a sensor; an antenna; a positioning circuit configured to receive satellite signals through the antenna using a specified frequency band; a resonant frequency adjustment circuit configured to adjust a resonant frequency of the antenna; and a processor, wherein the processor is configured to: identify whether the electronic device is in water using the sensor; if the electronic device is not in water, adjust the resonant frequency to a first frequency band specified according to a first permittivity of air in relation to the specified frequency band using the resonant frequency adjustment circuit; if the electronic device is in water, adjust the resonant frequency of the antenna to a second frequency band specified according to a second permittivity of water in relation to the specified frequency band using the resonant frequency adjustment circuit; receive the satellite signals through the antenna of which the resonant frequency has been adjusted to a frequency band corresponding to one of the first frequency band and the second frequency band using the positioning circuit; and determine a position of the electronic device primarily on the basis of the received satellite signals using the positioning circuit.

In various embodiments, the sensor may include a first sensor including at least one of an atmospheric-pressure sensor, a touch-sensitive sensor, a humidity sensor, or an underwater sensor, and the processor may be configured to identify whether the electronic device is in water primarily on the basis of data obtained from the first sensor.

In various embodiments, the antenna may include a first antenna corresponding to the first frequency band and a second antenna corresponding to the second frequency band, and the resonant frequency adjustment circuit may include a switch capable of selecting one of the first antenna and the second antenna. In addition, the processor may be configured to select the first antenna through the switch as at least a portion of the operation of adjusting the resonant frequency to the first frequency band, and may be configured to select the second antenna through the switch as at least a portion of the operation of adjusting the resonant frequency to the second frequency band.

In various embodiments, the antenna may include a first grounding point allowing the antenna to have a first length and a second grounding point allowing the antenna to have a second length, and the resonant frequency adjustment circuit may include a switch capable of selecting one of the first grounding point and the second grounding point. In addition, the processor may be configured to: select the first grounding point through the switch as at least a portion of the operation of adjusting the resonant frequency to the first frequency band; and select the second grounding point through the switch as at least a portion of the operation of adjusting the resonant frequency to the second frequency band.

In various embodiments, the resonant frequency adjustment circuit may include a first matching circuit connected to the ground and having a first impedance, a second matching circuit connected to the ground and having a second impedance, and a switch capable of selecting one of the first matching circuit and the second matching circuit, and the processor may be configured to: select the first matching circuit through the switch as at least a portion of the operation of adjusting the resonant frequency to the first frequency band; and select the second matching circuit through the switch as at least a portion of the operation of adjusting the resonant frequency to the second frequency band.

In various embodiments, the sensor may include a second sensor configured to generate data related to motion of the electronic device, and the processor may be configured to: determine a swimming style of a user of the electronic device using the second sensor; if the determined swimming style is a first swimming style, continue to receive the satellite signals for a specified period of time through the antenna of which the resonant frequency has been adjusted to the second frequency band; and if the determined swimming style is a second swimming style, receive the satellite signals through the antenna of which the resonant frequency has been alternately adjusted to the first frequency band and the second frequency band.

In various embodiments, the processor may be configured to: if the determined swimming style is the first swimming style, identify whether the electronic device is in water every first specified period; and if the determined swimming style is the second swimming style, identify whether the electronic device is in water every second specified period less than the first specified period.

In various embodiments, the processor may be configured to determine the swimming style primarily on the basis of a user input.

In various embodiments, the electronic device may further include: a display; and a communication module, wherein the processor may be configured to display information related to the determined position of the electronic device using the display or is configured to transmit information related to the determined position of the electronic device to an external device using the communication module.

In various embodiments, the antenna may be configured as a part of a housing of the electronic device, or may be provided inside the display of the electronic device.

Figure 8:
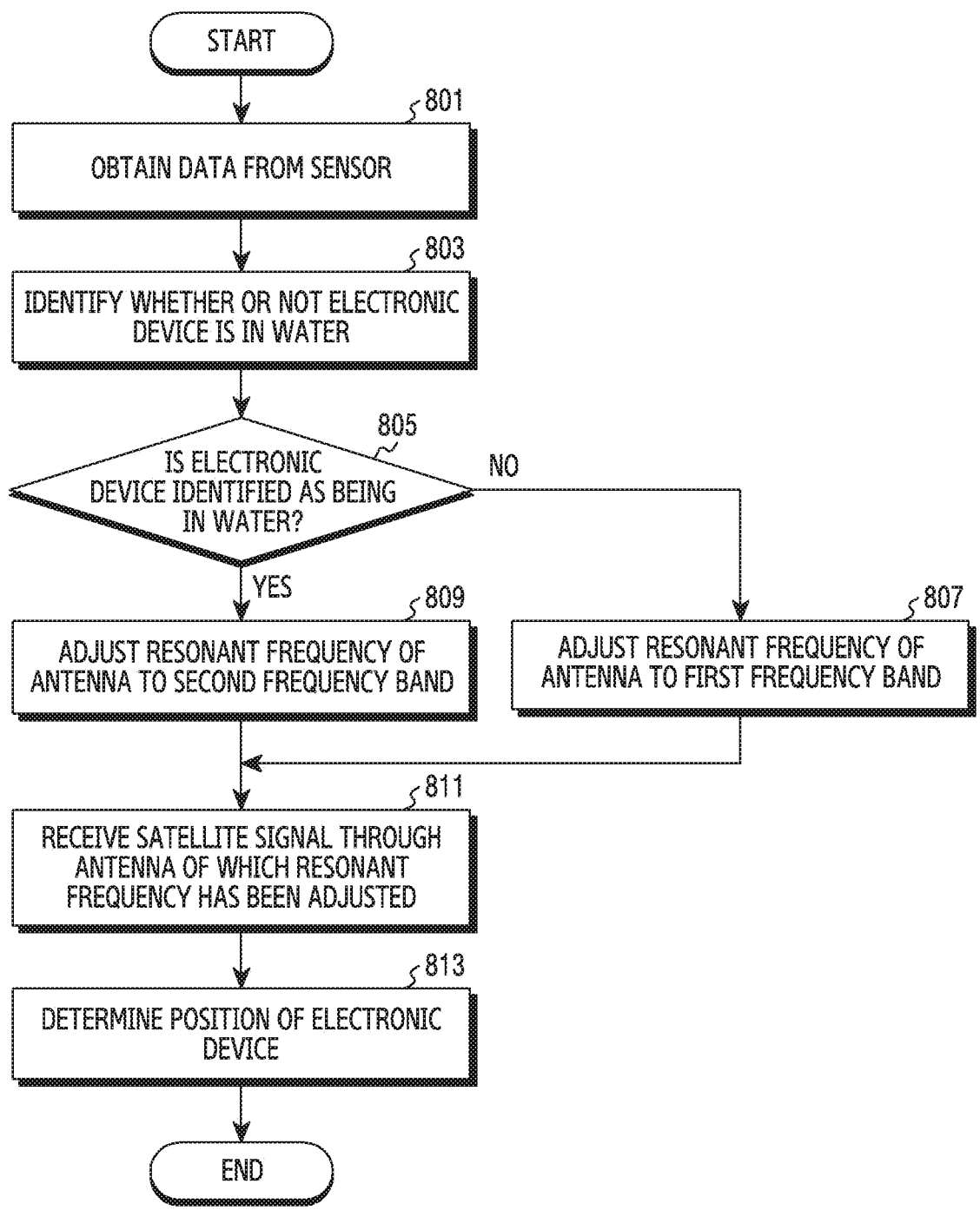
FIG. 8 is a flowchart illustrating a method for measuring a position of an electronic device according to an embodiment of the disclosure.

FIG. 8 is a flowchart illustrating a method for measuring a position of an electronic device according to an embodiment of the disclosure.

Referring to FIG. 8, in an embodiment, the processor 250 may obtain, from the sensor 210 (or the first sensor 211) data for identifying whether the electronic device 101 is in water or in air in operation 801. For example, the processor 250 may obtain, from the atmospheric-pressure sensor, data related to the atmospheric pressure of the electronic device 101 (or the atmospheric pressure around the electronic device 101). As another example, the processor 250 may obtain data related to a capacitance value from the touch-sensitive sensor. As another example, the processor 250 may obtain data related to the humidity of the electronic device 101 from the humidity sensor. As another example, the processor 250 may obtain, from the underwater sensor, data related to a short circuit between at least two of a plurality of pins included in the underwater sensor. In an embodiment, the processor 250 may obtain data for identifying whether the electronic device 101 is in water or in air from at least one of the atmospheric-pressure sensor, the touch-sensitive sensor, the humidity sensor, or the underwater sensor included in the first sensor 211.

In an embodiment, the processor 250 may identify whether the electronic device 101 is in water primarily on the basis of the data obtained from the first sensor 211 in operation 803.

In an embodiment, the processor 250 may identify whether the electronic device 101 is in water primarily on the basis of the data obtained from the atmospheric-pressure sensor. For example, if the data obtained from the atmospheric-pressure sensor represents about 1 atmosphere (or about 101 hPa), the processor 250 may determine that the electronic device 101 is in air. If the data obtained from the atmospheric-pressure sensor indicates an atmospheric pressure (e.g., about 106 to 107 hPa) increased by about 5 to 6 hPa, compared to the atmospheric pressure when the electronic device 101 is in air, the processor 250 may determine that the electronic device 101 is in water.

In an embodiment, the processor 250 may identify whether the electronic device 101 is in water primarily on the basis of the data obtained from the touch-sensitive sensor. For example, if the capacitance value obtained from the touch-sensitive sensor and coupled from a transmission port to a reception port is about 5 C, the processor 250 may determine that the electronic device 101 is in air. If the capacitance value obtained from the touch-sensitive sensor and coupled from the transmission port to the reception port is about 0 C, the processor 250 may determine that the electronic device 101 is in water. In an embodiment, if the capacitance value obtained from the touch-sensitive sensor and coupled from the transmission port to the reception port is maintained to be about 0 C for a specified period of time, the processor 250 may determine that the electronic device 101 is in water. In an embodiment, if the area of the reception port, in which the capacitance value obtained from the touch-sensitive sensor and coupled from the transmission port to the reception port represents (or is measured to be) about 0 C, is equal to or greater than a specified area, the processor 250 may determine that the electronic device 101 is in water.

In an embodiment, the processor 250 may identify whether the electronic device 101 is in water primarily on the basis of the data obtained from the humidity sensor. For example, if the data obtained from the humidity sensor indicates that the moisture percentage in air is less than a specified value, the processor 250 may determine that the electronic device 101 is in air. If the data obtained from the humidity sensor indicates that the moisture percentage in air is equal to or greater than a specified value (e.g., if the moisture percentage in air is about 100%), the processor 250 may determine that the electronic device 101 is in water.

In an embodiment, the processor 250 may identify whether the electronic device 101 is in water primarily on the basis of the data obtained from the underwater sensor. For example, if the data obtained from the underwater sensor indicates that at least two of a plurality of pins included in the underwater sensor are electrically short-circuited, the processor 250 may determine that the electronic device 101 is in water. If the data obtained from the underwater sensor indicates that at least two of the plurality of pins included in the underwater sensor are not electrically short-circuited, the processor 250 may determine that the electronic device 101 is in air. In an embodiment, if no data is obtained data from the underwater sensor, the processor 250 may determine that the electronic device 101 is in air.

In an embodiment, the processor 250 may execute an application related to the position of the electronic device 101 before obtaining the data from the first sensor 211. For example, the processor 250 may execute an application for measuring the position of the electronic device 101, a navigation application, a map application, or a web application before obtaining the data from the first sensor 211. In an embodiment, the processor 250 may execute an application related to the position of the electronic device 101 while obtaining the data from the first sensor 211 or after obtaining the data from the first sensor 211. If the processor 250 executes an application related to the position of the electronic device 101 while obtaining the data from the first sensor 211 or after obtaining the data from the first sensor 211, the processor 250 may receive data from the first sensor 211 after the execution of an application related to the position of the electronic device 101.

In an embodiment, the processor 250 may identify whether the electronic device 101 is located in a sea or in a river (or a lake). For example, the processor 250 may identify whether the latitude and longitude of the electronic device 101 correspond to the position information of a sea or a river using an application related to the position of the electronic device 101, thereby determining whether the electronic device 101 is located in a sea or in a river (or a lake). In an embodiment, the operation of identifying whether the electronic device 101 is located in a sea or in a river (or a lake) may be performed before performing the operation of identifying whether the electronic device 101 is in water primarily on the basis of the data obtained from the first sensor 211. For example, the processor 250 may measure the position of the electronic device 101 using the first antenna, and may identify whether the measured position of the electronic device 101 corresponds to the position of a sea or a river using an application related to the position of the electronic device 101 before (or immediately before) the processor 250 performs an operation of identifying whether the electronic device 101 is in water primarily on the basis of the data obtained from the first sensor 211. In an embodiment, the position of the electronic device 101, which is used to identify whether the electronic device 101 is located in a sea or in a river (or a lake), may be the one that was most recently (or lastly) measured through the first antenna 221 before the processor 250 performs the operation of identifying whether the electronic device 101 is in water primarily on the basis of the data obtained from the first sensor 211.

In an embodiment, the processor 250 may identify whether the electronic device 101 is located in sea water or in fresh water primarily on the basis of the data obtained from the first sensor 211 and information on whether the electronic device 101 is located in a sea or in a river. For example, if the data obtained from the first sensor 211 indicates that the electronic device 101 is in water, and if the information on whether the electronic device 101 is located in a sea or in a river indicates that the electronic device 101 is located in a sea, the processor 250 may determine that the electronic device 101 is in sea water. As another example, if the data obtained from the first sensor 211 indicates that the electronic device 101 is in water, and if the information on whether the electronic device 101 is located in a sea or in a river indicates that the electronic device 101 is located in a river, the processor 250 may determine that the electronic device 101 is in fresh water.

In an embodiment, if the processor 250 determines that the electronic device 101 is not in water (or is in air) in operation 805, the processor 250 may adjust the resonant frequency of the antenna 220 to a first frequency band specified according to a first permittivity of air using the resonant frequency adjustment circuit 230 in operation 807. For example, if the antenna 220 is implemented as a first antenna scheme, the processor 250 may control a switching operation of the switch 231 such that the switch 231 is connected to a matching circuit that is connected to the first antenna 221 and is intended to match the impedance of the first antenna 221. As another example, if the antenna 220 is implemented as a second antenna scheme, the processor 250 may control a switching operation of the switch 231 such that the switch 231 is connected to a matching circuit that is connected to the first grounding point (A) and is intended to match the impedance of the antenna 220. As another example, if the antenna 220 is implemented as a third antenna scheme, the processor 250 may control a switching operation of the switch 231 such that the switch 231 is connected to a matching circuit that is connected to the antenna 220 and the ground and is used to measure the position of the electronic device 101 in air.

In an embodiment, if the processor 250 determines that the electronic device 101 is in air, the processor 250 may adjust the resonant frequency of the antenna 220 to a first frequency band.

In an embodiment, if the processor 250 determines that the electronic device 101 is in water in operation 805, the processor 250 may adjust the resonant frequency of the antenna 220 to a second frequency band specified according to a second permittivity of water using the resonant frequency adjustment circuit 230 in operation 809. For example, if the antenna 220 is implemented as a first antenna scheme, the processor 250 may control a switching operation of the switch 231 such that the switch 231 is connected to a matching circuit that is connected to the second antenna 222 (or the third antenna 223) and is intended to match the impedance of the second antenna 222. As another example, if the antenna 220 is implemented as a second antenna scheme, the processor 250 may control a switching operation of the switch 231 such that the switch 231 is connected to a matching circuit that is connected to the second grounding point (B) and is intended to match the impedance of the antenna 220. As another example, if the antenna 220 is implemented as a third antenna scheme, the processor 250 may control a switching operation of the switch 231 such that the switch 231 is connected to a matching circuit that is connected to the antenna 220 and the ground and is used to measure the position of the electronic device 101 in water.

In an embodiment, if the processor 250 determines that the electronic device 101 is in water, the processor 250 may adjust the resonant frequency of the antenna to the second frequency band in water.

In an embodiment, if the processor 250 determines that the electronic device 101 is in sea water, the processor 250 may adjust the resonant frequency of the antenna 220 to a frequency band specified according to the permittivity of sea water using the resonant frequency adjustment circuit 230.

In an embodiment, if the processor 250 determines that the electronic device 101 is in fresh water, the processor 250 may adjust the resonant frequency of the antenna 220 to a frequency band specified according to the permittivity of fresh water using the resonant frequency adjustment circuit 230.

In an embodiment, the operation in which the processor 250 determines that the electronic device 101 is in sea water or in fresh water and adjusts the resonant frequency of the antenna 220 to the frequency band specified according to the permittivity of sea water or fresh water using the resonant frequency adjustment circuit 230 may be similar to the operation in which the processor 250 determines that the electronic device 101 is in water and adjusts the resonant frequency of the antenna 220 to a second frequency band specified according to the second permittivity of water using the resonant frequency adjustment circuit 230.

In an embodiment, the processor 250 may receive satellite signals through the antenna 220 of which the resonant frequency has been adjusted in operation 811. For example, if the satellite signals are transmitted to the positioning circuit 240 through the antenna 220 of which the resonant frequency has been adjusted, the processor 250 may receive the satellite signals from the positioning circuit 240.

In an embodiment, the processor 250 may determine (or measure or produce) the position of the electronic device 101 primarily on the basis of the received satellite signals in operation 813. In an embodiment, the processor 250 may determine the position of the electronic device 101 primarily on the basis of the satellite signals using a variety of methods, such as point positioning, relative positioning, and the like. However, a method of determining the position of the electronic device 101 is not limited thereto.

In an embodiment, the processor 250 may include a configuration (or a module) for measuring the position of the electronic device 101 primarily on the basis of the satellite signals. In an embodiment, the configuration for measuring the position of the electronic device 101 primarily on the basis of the satellite signals may be provided in the electronic device 101 independently from the processor 250.

Figure 9:
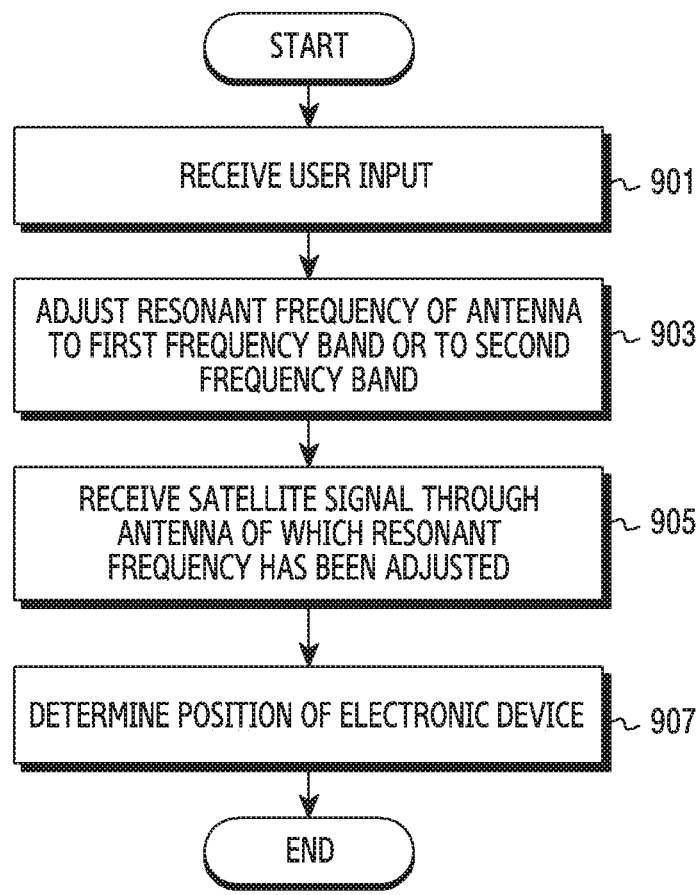
FIG. 9 is a flowchart illustrating a method for measuring a position of an electronic device primarily on the basis of a user input according to an embodiment of the disclosure.

FIG. 9 is a flowchart for explaining a method for measuring a position of an electronic device primarily on the basis of a user input according to an embodiment of the disclosure.

Referring to FIG. 9, in an embodiment, the processor 250 may receive a first user input for measuring the position of the electronic device 101 in air (or a first user input representing a user's intention to measure the position of the electronic device 101 in air) or a second user input for measuring the position of the electronic device 101 in water (or a second user input representing a user's intention to measure the position of the electronic device 101 in water) in operation 901.

In an embodiment, in operation 903, the processor 250 may adjust the resonant frequency of the antenna 220 to a first frequency band or a second frequency band primarily on the basis of the received user input.

In an embodiment, the processor 250 may perform an operation of adjusting the resonant frequency of the antenna 220 to a first frequency band primarily on the basis of the first user input for measuring the position of the electronic device 101 in air.

In an embodiment, the processor 250 may perform an operation of adjusting the resonant frequency of the antenna 220 to a second frequency band primarily on the basis of the second user input for measuring the position of the electronic device 101 in water.

In an embodiment, the processor 250 may receive satellite signals through the antenna 220 of which the resonant frequency has been adjusted in operation 905. For example, if the satellite signals are transmitted to the positioning circuit 240 through the antenna 220 of which the resonant frequency has been adjusted, the processor 250 may receive the satellite signals from the positioning circuit 240.

In an embodiment, the processor 250 may determine (or measure or produce) the position of the electronic device 101 primarily on the basis of the received satellite signals in operation 907.

Figure 10:
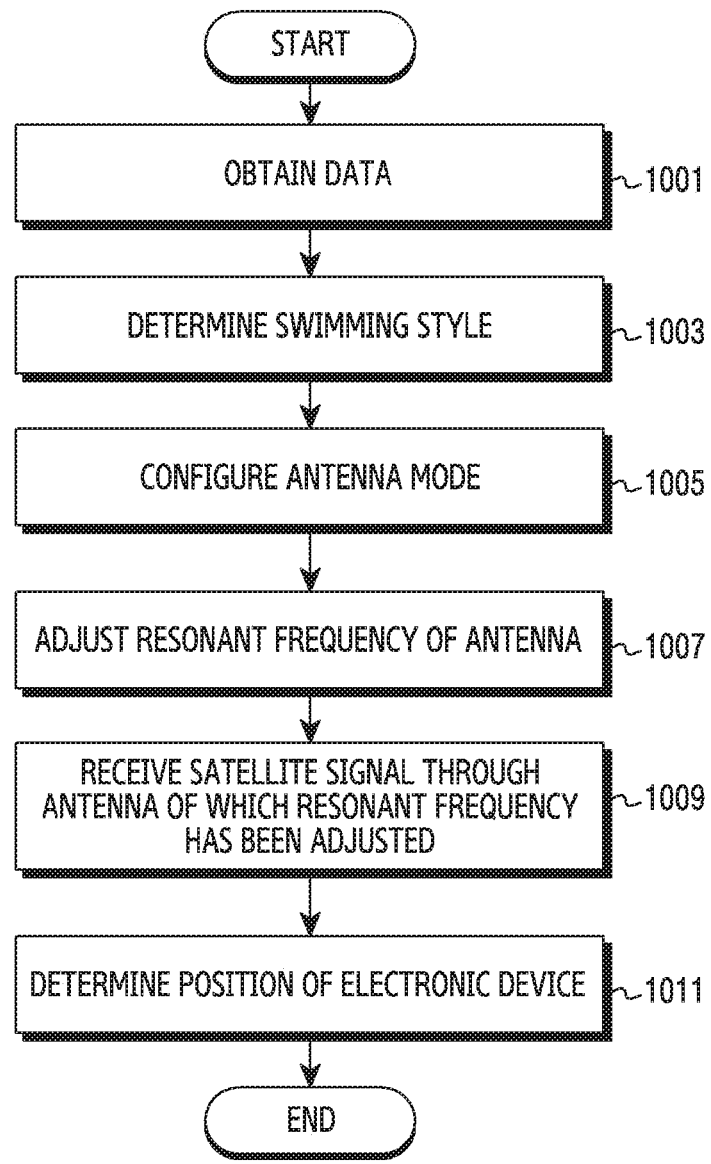
FIG. 10 is a flowchart illustrating a method for measuring a position of an electronic device in consideration of swimming styles according to an embodiment of the disclosure.

FIG. 10 is a flowchart for explaining a method for measuring the position of an electronic device 101 in consideration of swimming styles according to an embodiment of the disclosure.

Referring to FIG. 10, in an embodiment, the processor 250 may receive data for identifying motion of the electronic device 101 (or motion of a user wearing the electronic device 101) from the sensor 210 (or the second sensor 213) in operation 1001.

In an embodiment, the processor 250 may determine a swimming style primarily on the basis of the information obtained from the sensor 210 in operation 1003.

In an embodiment, for example, if the electronic device 101 is worn on a user's wrist, the processor 250 may determine whether the swimming style is breaststroke, front crawl, backstroke, or butterfly stroke primarily on the basis of the data related to the rotational motion of the electronic device 101 caused by the rotation of the user's arm, which is obtained from the second sensor 213. For example, the processor 250 may compare the data obtained from the second sensor 213 with specified swimming style-related data (or data pattern) stored in the memory 130. If the data obtained from the second sensor 213 corresponds to the specified swimming style-related data, the processor 250 may determine the swimming style of the user of the electronic device 101 to be the swimming style corresponding to the specified swimming style-related data (or the swimming style indicated by the specified swimming style-related data).

In an embodiment, if the electronic device 101 including the second sensor 213 is worn on at least one of a user's ankle or wrist, as well as a user's head, the processor 250 may determine whether the swimming style is breaststroke, front crawl, backstroke, or butterfly stroke primarily on the basis of the data related to the rotational motion of the electronic device 101 caused by the rotation of the user's arm and at least one piece of the data related to the motion of the electronic device 101 caused by the reciprocating motion of a foot or the data related to the motion of the electronic device 101 caused by the motion of the user's head.

Although breaststroke, front crawl, backstroke, and butterfly stroke are illustrated as swimming styles in the above example, the swimming styles are not limited thereto. For example, the processor 250 may identify other swimming styles, in addition to breaststroke, front crawl, backstroke, and butterfly stroke, primarily on the basis of the data obtained from the second sensor 213.

In an embodiment, the processor 250 may configure the antenna mode according to the determined swimming style in operation 1005.

In an embodiment, if the processor 250 determines that the user's swimming style is breaststroke, the processor 250 may configure the antenna mode as a first antenna mode.

In an embodiment, if the processor 250 determines that the user's swimming style is front crawl, backstroke, or butterfly stroke, the processor 250 may configure the antenna mode as a second antenna mode.

In an embodiment, the processor 250 may adjust the resonant frequency of the antenna 220 to correspond to the configured antenna mode in operation 1007.

In an embodiment, if the antenna mode is configured as the first antenna mode, the processor 250 may control the resonant frequency adjustment circuit 230 such that the resonant frequency of the antenna is maintained to be the second frequency band during a specified period of time.

In an embodiment, if the antenna mode is configured as the first antenna mode, the processor 250 may identify whether the electronic device 101 is in water for a period equal to or greater than a specified time period. In an embodiment, if the antenna mode is configured as the first antenna mode, the first sensor 211 may generate data for identifying whether the electronic device 101 is in water for a period equal to or greater than a specified time period (or at a sampling rate equal to or less than a specified sampling rate). In an embodiment, if the antenna mode is configured as the first antenna mode, the processor 250 may obtain data for identifying whether the electronic device 101 is in water for a period equal to or greater than a specified time period. In an embodiment, if the antenna mode is configured as the first antenna mode, the processor 250 may identify whether the electronic device 101 is in water for a period equal to or greater than a specified time period primarily on the basis of the data obtained from the first sensor 211.

In an embodiment, if the antenna mode is configured as the first antenna mode, the processor 250 may identify whether the electronic device 101 is in water for a period equal to or greater than a specified time period, and may adjust the resonant frequency of the antenna 220 to a first frequency band or a second frequency band depending on whether the electronic device 101 is in air or in water.

In an embodiment, if the antenna mode is configured as the second antenna mode, the processor 250 may alternately adjust the resonant frequency of the antenna 220 to a first frequency band and a second frequency band.

In an embodiment, if the antenna mode is configured as the second antenna mode, the processor 250 may identify whether the electronic device 101 is in water for a period less than a specified time period. In an embodiment, if the antenna mode is configured as the second antenna mode, the first sensor 211 may generate data for identifying whether the electronic device 101 is in water for a period less than a specified time period (or at a sampling rate greater than a specified sampling rate). In an embodiment, if the antenna mode is configured as the second antenna mode, the processor 250 may obtain, from the first sensor 211, data for identifying whether the electronic device 101 is in water for a period less than a specified time period. In an embodiment, if the antenna mode is configured as the second antenna mode, the processor 250 may identify whether the electronic device 101 is in water for a period less than a specified time period primarily on the basis of the data obtained from the first sensor 211.

In an embodiment, if the antenna mode is configured as the second antenna mode, the processor 250 may identify whether the electronic device 101 is in water for a period less than a specified time period, and may adjust the resonant frequency of the antenna 220 to a first frequency band or a second frequency band depending on whether the electronic device 101 is in air or in water.

In an embodiment, the processor 250 may receive satellite signals through the antenna of which the resonant frequency has been adjusted in operation 1009. For example, if the positioning circuit 240 receives satellite signals through the antenna 220 of which the resonant frequency has been adjusted, the processor 250 may receive the satellite signals from the positioning circuit 240.

In an embodiment, the processor 250 may determine the position of the electronic device 101 on the basis of the received satellite signals in operation 1011.

Figure 11:
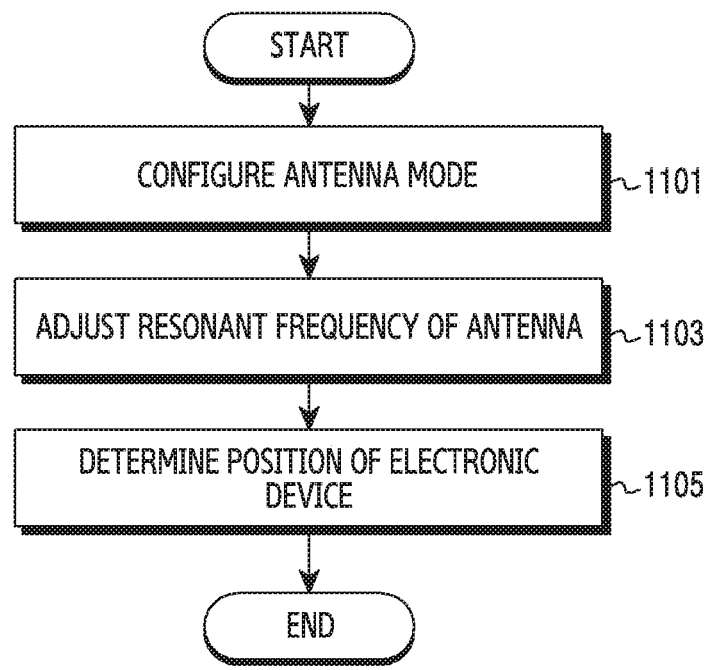
FIG. 11 is a flowchart illustrating a method for measuring a position of an electronic device primarily on the basis of a user input and in consideration of swimming styles according to an embodiment of the disclosure.

FIG. 11 is a flowchart for explaining a method for measuring a position of an electronic device primarily on the basis of a user input and in consideration of swimming styles according to an embodiment of the disclosure.

Referring to FIG. 11, in operation 1101, the processor 250 may configure the antenna mode corresponding to a swimming style primarily on the basis of a user input.

In an embodiment, the user input for determining the antenna mode may include an input for selecting at least one of breaststroke, front crawl, backstroke, or butterfly stroke or an input for selecting a first antenna mode or a second antenna mode.

In an embodiment, the processor 250 may adjust the resonant frequency of the antenna 220 to correspond to the configured antenna mode in operation 1103.

In an embodiment, the processor 250 may receive satellite signals through the antenna 220 of which the resonant frequency has been adjusted, and may determine the position of the electronic device 101 primarily on the basis of the received satellite signals in operation 1105.

Figure 12:
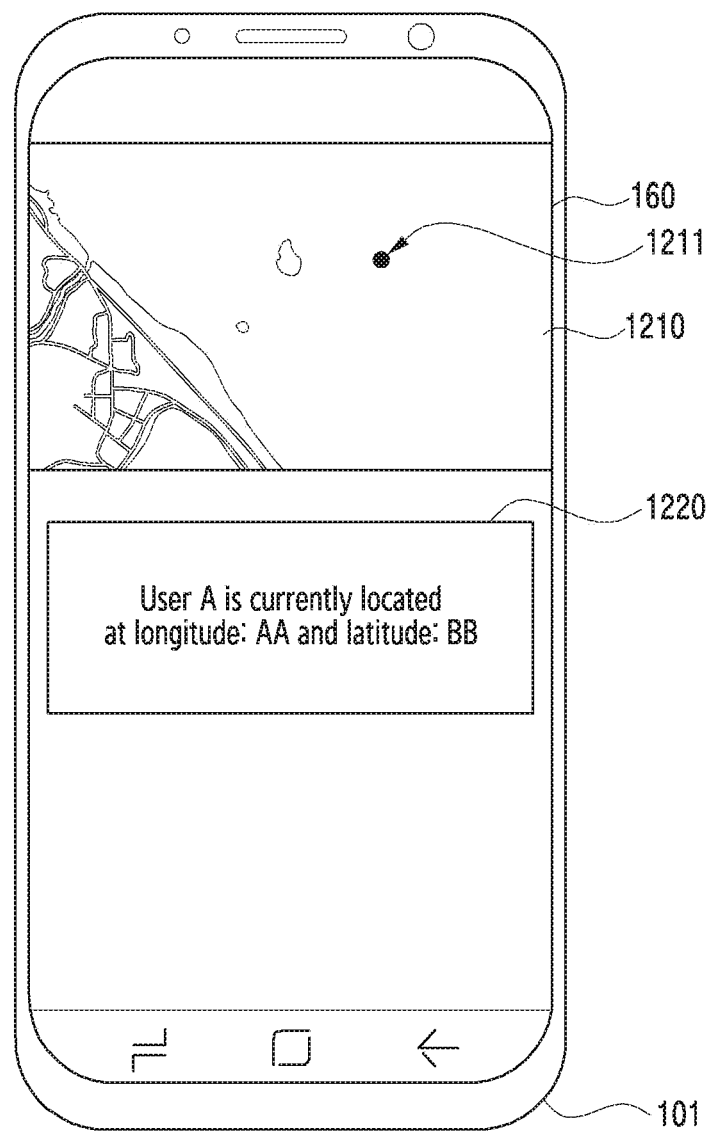
FIG. 12 is a diagram illustrating a method of displaying a measured position of an electronic device according to an embodiment of the disclosure.

FIG. 12 is a diagram illustrating a method of displaying a measured position of an electronic device according to an embodiment of the disclosure.

Referring to FIG. 12, in an embodiment, the processor 250 may display the measured position of the electronic device 101 (or the current position of the electronic device 101) on a map 1210 using the display 160. For example, the processor 250 may display a mark 1211 indicating the position of the electronic device 101 on the map 1210 using the display 160. In an embodiment, the processor 250 may display the measured position of the electronic device 101 on the map 1210 in real time using the display 160.

In an embodiment, the processor 250 may display a notification 1220 of the position of the electronic device 101 on the display 160. For example, the processor 250 may display the sentence "User A is currently located at longitude: AA and latitude: BB" on the display 160.

In an embodiment, although FIG. 12 illustrates that the electronic device 101 measuring the position of the electronic device 101 displays the position of the electronic device 101, the disclosure is not limited thereto. For example, the electronic device 101 may measure the position of the electronic device 101, and may then transmit information about the measured position of the electronic device 101 to the external electronic device 102 through the communication module 190 (e.g., Bluetooth or a cellular communication module). Upon receiving the information about the position of the electronic device 101, the external electronic device 102 may display a screen as shown in FIG. 12.

Figure 13:
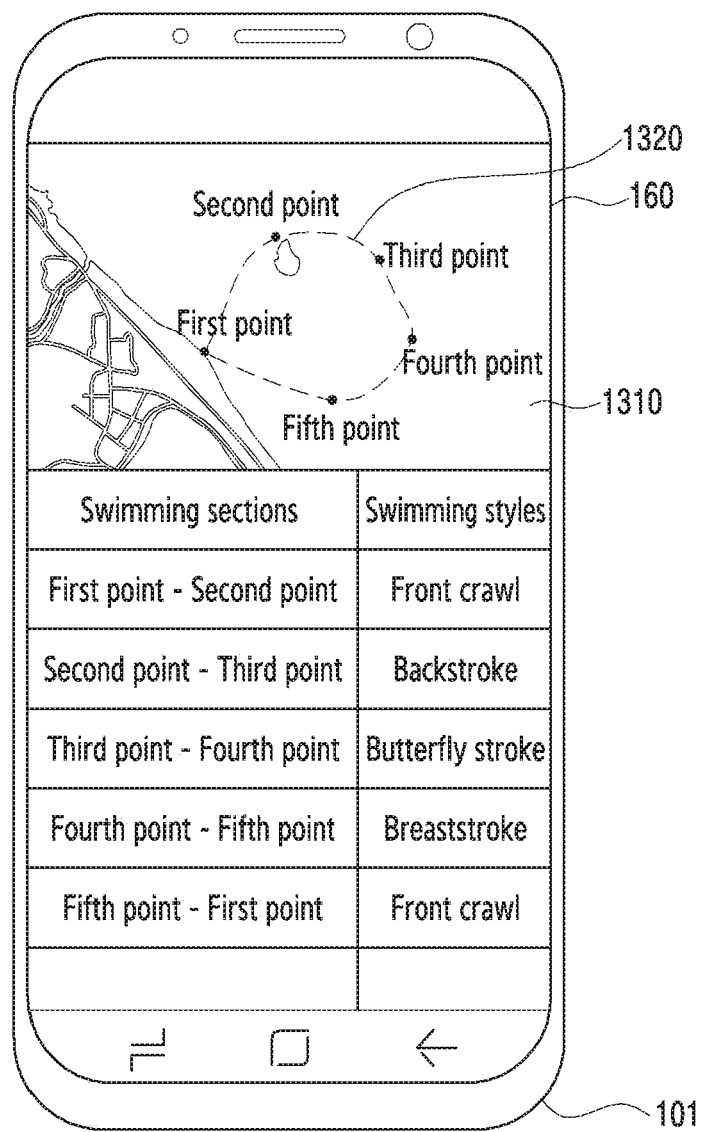
FIG. 13 is a diagram illustrating a method of displaying a travel path of an electronic device at least on the basis of a measured position of an electronic device according to an embodiment of the disclosure.

FIG. 13 is a diagram illustrating a method of displaying a travel path of an electronic device at least on the basis of a measured position of the electronic device according to an embodiment of the disclosure.

Referring to FIG. 13, in an embodiment, the processor 250 may determine a travel path of the electronic device 101 primarily on the basis of the measured position of the electronic device 101. For example, the processor 250 may determine the travel path of the electronic device 101 by storing (or recording or tracking) the position of the electronic device 101 measured with time. In an embodiment, the processor 250 may display the determined travel path of the electronic device 101 on the display 160. For example, the processor 250 may display the determined travel path 1320 of the electronic device 101 on a map 1310 using the display 160 as shown in FIG. 13. However, a method of displaying the travel path 1320 of the electronic device 101 is not limited to the example in FIG. 13. In an embodiment, the processor 250 may display the determined travel path of the electronic device 101 in real time on the display 160.

In an embodiment, the processor 250 may determine a swimming style corresponding to the position of the electronic device 101 (or the travel path of the electronic device 101) while measuring the position of the electronic device 101, and may display sections (or swimming sections) of the travel path of the electronic device 101 and the swimming styles corresponding to the sections of the travel path of the electronic device 101 on the display 160. For example, as shown in FIG. 13, the processor 250 may perform control the display 160 so as to display the user swimming the front crawl while the electronic device 101 travels from the first point to the second point on the map 1310, the user swimming the backstroke while the electronic device 101 travels from the second point to the third point on the map 1310, the user swimming the butterfly stroke while the electronic device 101 travels from the third point to the fourth point on the map 1310, the user swimming the breaststroke while the electronic device 101 travels from the fourth point to the fifth point on the map 1310, and the user swimming the front crawl while the electronic device 101 travels from the fifth point to the first point on the map 1310.

In an embodiment, the processor 250 may display the first point to the fifth point on the map 1310 using the display 160.

However, a method of displaying the travel path of the electronic device 101 and the swimming styles is not limited to the example in FIG. 13.

In an embodiment, although FIG. 13 illustrates that the electronic device 101 determining the travel path of the electronic device 101 displays the travel path of the electronic device 101, the disclosure is not limited thereto. For example, the processor 250 may determine the travel path of the electronic device 101, and may then transmit information about the determined travel path of the electronic device 101 to the external electronic device 102 through the communication module 190 (e.g., a cellular communication module). Upon receiving the information about the travel path of the electronic device 101, the external electronic device 102 may display a screen as shown in FIG. 13.

Figure 14:
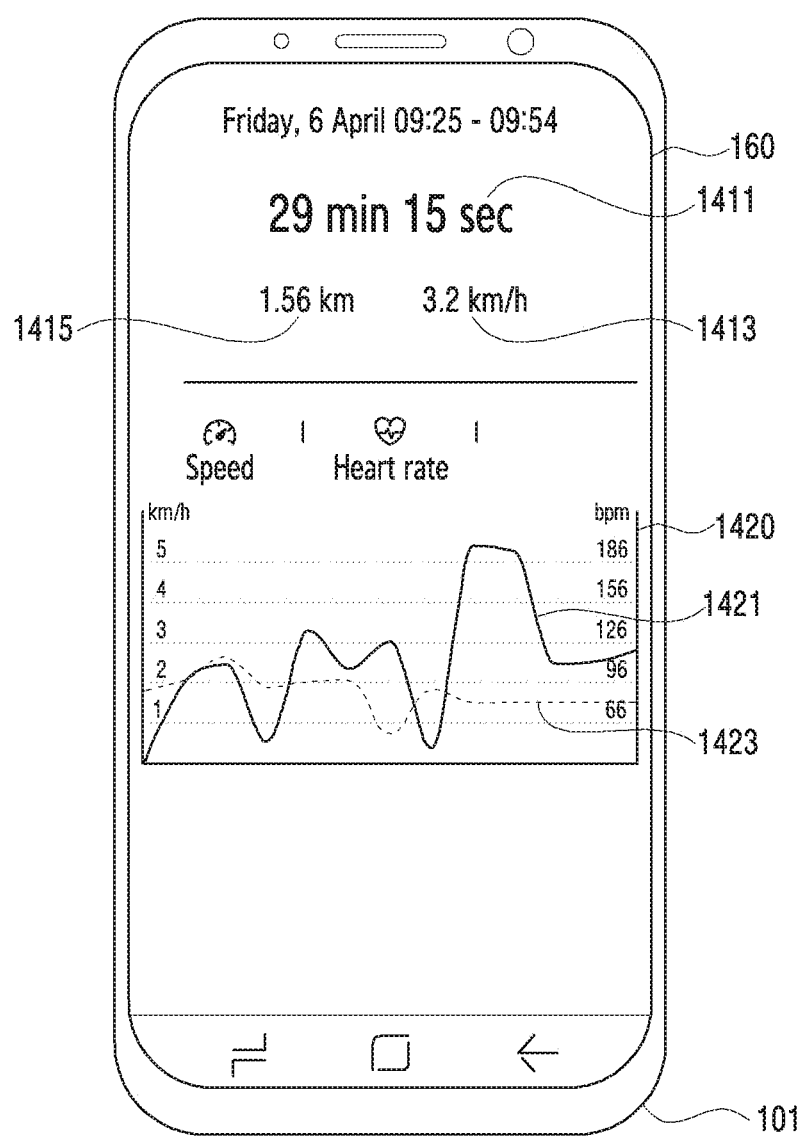
FIG. 14 is a diagram illustrating a method of displaying exercise information obtained from a user who is swimming while wearing an electronic device according to an embodiment of the disclosure.

FIG. 14 is a diagram illustrating a method of displaying exercise information obtained from a user who is swimming while wearing an electronic device according to an embodiment of the disclosure.

Referring to FIG. 14, in an embodiment, the processor 250 may display, on the display 160, exercise information obtained from the user who is swimming while wearing the electronic device 101.

In an embodiment, the processor 250 may display, on the display 160, a swimming time 1411 of the user, a travel distance 1415 of the user by swimming, and a swimming speed (or average speed) 1413 of the user.

In an embodiment, the processor 250 may display, on the display 160, a graph 1420 including a curve 1421 indicating a change in the swimming speed of the user while the user is swimming and a curve 1423 indicating a change in the user's heart rate while the user is swimming.

In FIG. 14, a swimming time 1411 of the user, a travel distance 1415 of the user by swimming, an average swimming speed 1413 of the user, a curve 1421 indicating a change in the user's swimming speed while the user is swimming, and a curve 1423 indicating a change in the user's heart rate while the user is swimming are illustrated as the exercise information, but the exercise information measured by the electronic device 101 is not limited thereto.

Figure 15:
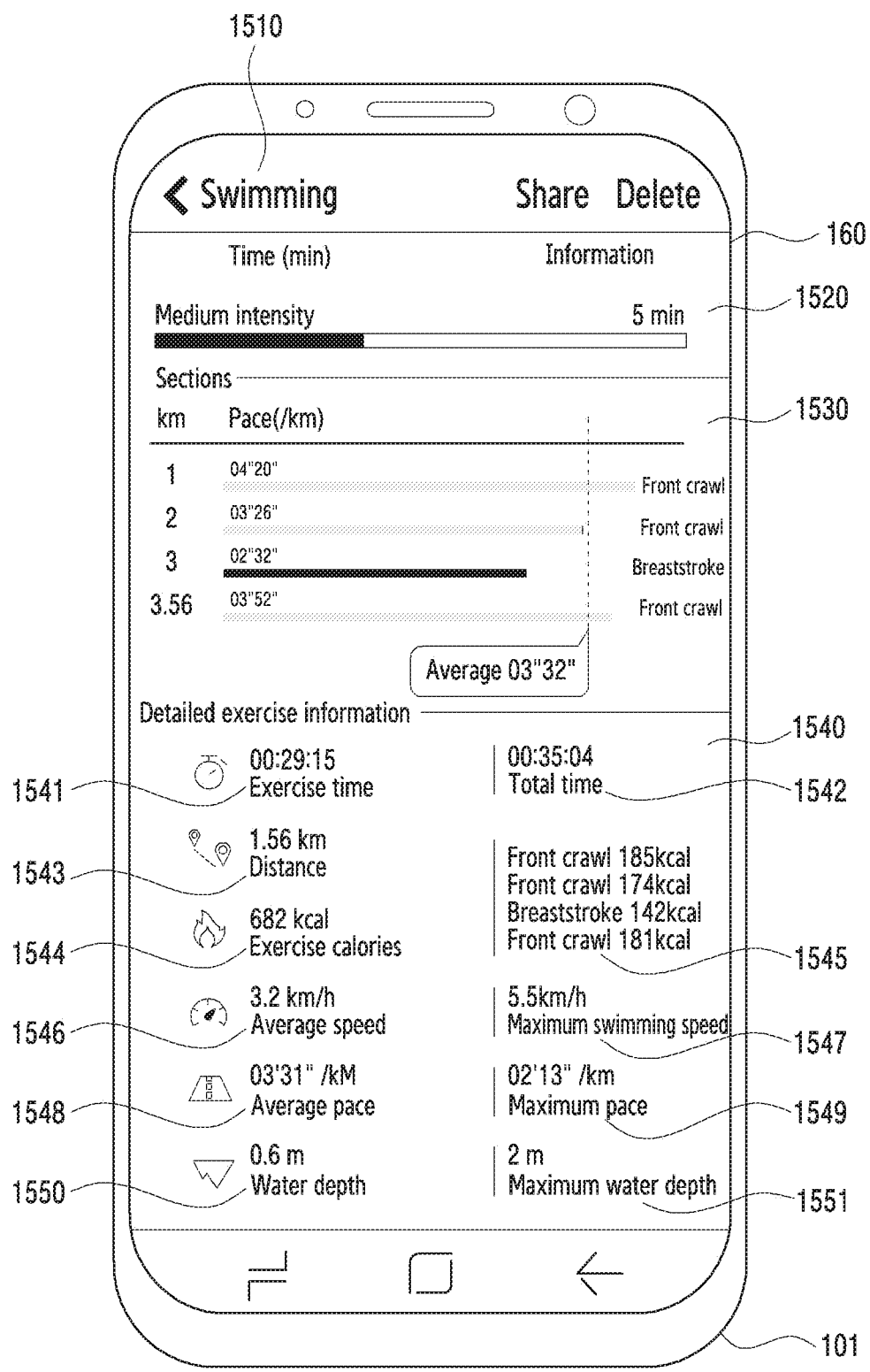
FIG. 15 is a diagram illustrating a method of displaying a variety of information provided by a user who is swimming while wearing an electronic device according to an embodiment of the disclosure.

FIG. 15 is a diagram illustrating a method of displaying a variety of information provided by a user who is swimming while wearing an electronic device according to an embodiment of the disclosure.

Referring to FIG. 15, in an embodiment, the processor 250 may display, on the display 160, a mark 1510 showing that the type of exercise performed by the user is swimming, information 1520 about the intensity of the swimming performed by the user, information 1530 about a pace according to the travel distance by swimming and swimming styles, and detailed exercise information 1540 about swimming.

In an embodiment, the processor 250 may display, on the display 160, as detailed exercise information 1540 about swimming, a swimming time of the user 1541, a time of measuring the user's action related to the swimming 1542, a travel distance by swimming 1543, total calories consumed by the user during the swimming 1544, calories consumed depending on swimming styles 1545, an average swimming speed 1546, a maximum swimming speed 1547, an average swimming pace 1548, a maximum swimming pace 1549, an average depth of water in the user's travel path by swimming 1550, and a maximum water depth 1551 in the user's travel path by swimming. In an embodiment, the processor 250 may display, on the display 160, at least some of the detailed exercise information 1540 about swimming, which is illustrated in FIG. 15, or may display exercise information (e.g., an average travel speed by swimming) other than at least some of the detailed exercise information 1540.

In an embodiment, the processor 250 may calculate the calories 1544 consumed for the respective swimming styles primarily on the basis of the average calorie consumption according to the swimming styles and travel distances according to the swimming styles.

In an embodiment, the processor 250 may calculate the calories consumed by swimming primarily on the basis of the data obtained through a second motion sensor. For example, the processor 250 may calculate the number of rotations of a user's arm on the basis of the data obtained through the second motion sensor, and may calculate the calories consumed by swimming primarily on the basis of the calculated number of rotations of the user's arm and calories consumed by one rotation of the user's arm. In an embodiment, the processor 250, for example, may calculate the calories consumed by swimming primarily on the basis of the calculated number of rotations of the user's arm, calories consumed by one rotation of the user's arm, and a user's weight. However, a method of calculating the consumed calories is not limited to the example described above.

Figure 16A:
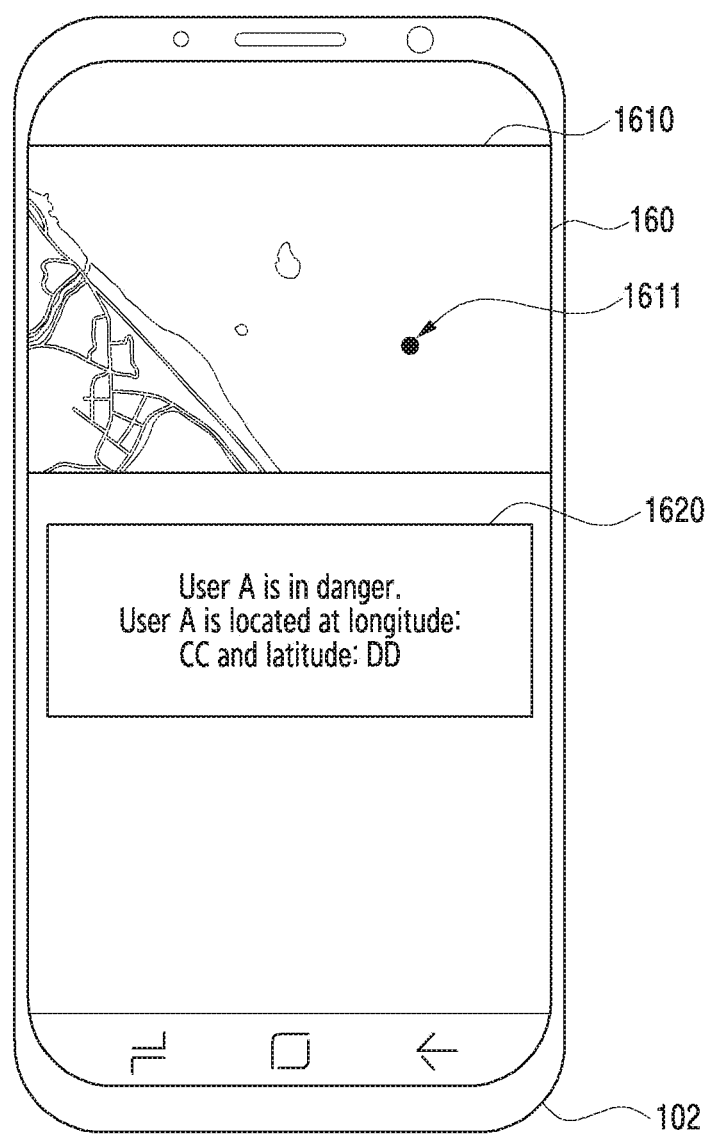
FIG. 16A is a diagram illustrating a method in which an electronic device transmits, to an external electronic device, information related to a dangerous situation of a user wearing the electronic device according to an embodiment of the disclosure.
Figure 16B:
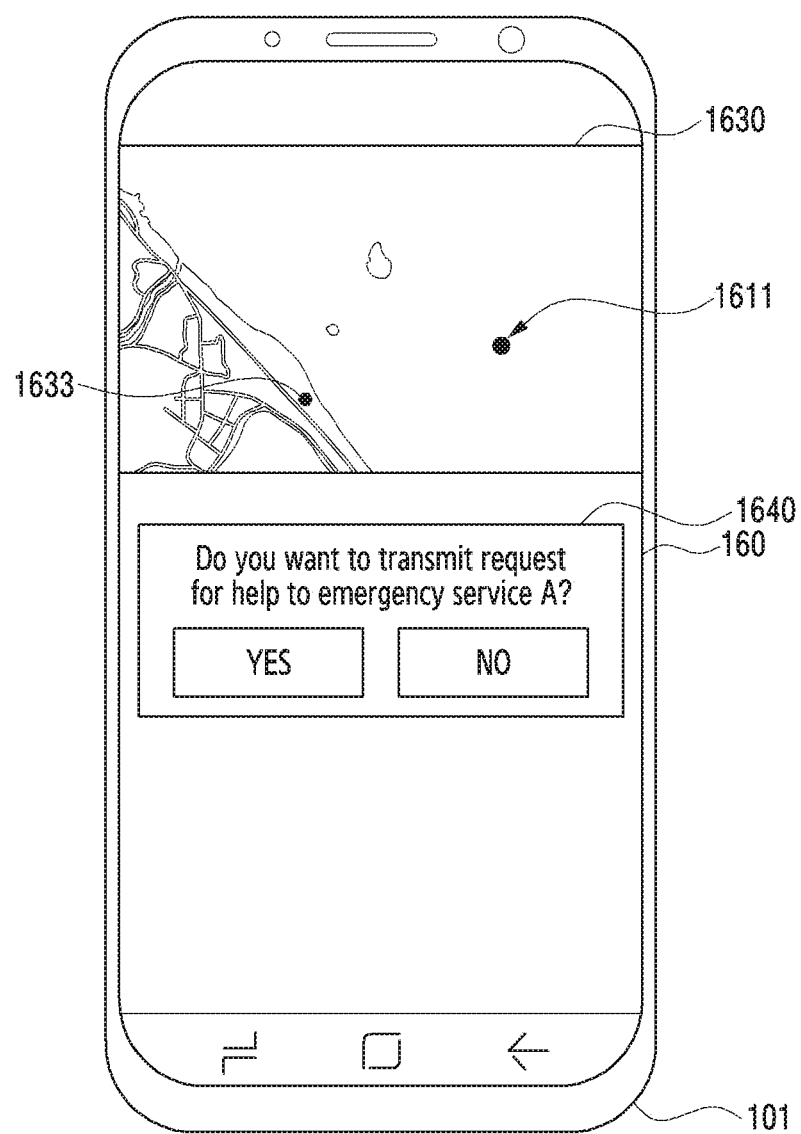
FIG. 16B is a diagram illustrating a method in which an electronic device transmits, to an external electronic device, information related to a dangerous situation of a user wearing the electronic device according to an embodiment of the disclosure.

FIGS. 16A and 16B are diagrams illustrating methods in which an electronic device transmits, to an external electronic device, information related to a dangerous situation of a user wearing the electronic device according to various embodiments of the disclosure.

Referring to FIG. 16A, in an embodiment, if it is identified that the electronic device 101 remains in water for a specified period of time or more, and if the position of the electronic device 101 is maintained (or is not changed) for a specified period of time or more, the processor 250 may determine that the user of the electronic device 101 is in a dangerous (or emergency) situation. In an embodiment, if it is identified that the electronic device 101 remains in water for a specified period of time or more, and if the data obtained through the second sensor 213 indicates that no motion of the user wearing the electronic device 101 is detected (or if the data obtained through the second sensor 213 indicates that the magnitude of motion of the user wearing the electronic device 101 is less than a specified magnitude of motion), the processor 250 may determine that the user of the electronic device 101 is in a dangerous (or emergency) situation. In an embodiment, if it is identified that the electronic device 101 is in a sea or in a river (or a lake), and if it is identified that the position of the electronic device 101 is maintained for a specified period of time or more or that no motion of the user is detected, the processor 250 may determine that the user of the electronic device 101 is in a dangerous (or emergency) situation. In an embodiment, if it is identified that the electronic device 101 is in a sea or in a river (or a lake), and if it is identified that the motion of the user does not correspond to the swimming style, such as breaststroke, front crawl, backstroke, or butterfly stroke, the processor 250 may determine that the user of the electronic device 101 is in a dangerous (or emergency) situation. However, a method of determining that the user of the electronic device 101 is in a dangerous situation is not limited to the above-described example.

In an embodiment, if the processor 250 determines that the user of the electronic device 101 is in a dangerous situation, the processor 250 may transmit, to the external electronic device 102, information indicating that the user of the electronic device 101 is in a dangerous situation along with information about the position of the electronic device 101 using the communication module 190 (e.g., a cellular communication module). In an embodiment, the external electronic device 102 may be provided in an emergency service closest to the position of the electronic device 101. In an embodiment, if the processor 250 determines that the user of the electronic device 101 is in a dangerous situation, the processor 250 may search for an emergency service closest to the position of the electronic device 101 using a web application, and may transmit, to the external electronic device 102 provided in the searched emergency service, information indicating that the user of the electronic device 101 is in a dangerous situation along with information about the position of the electronic device 101.

In an embodiment, if the processor 250 determines that the user of the electronic device 101 is in a dangerous situation, the processor 250 may automatically (or without a user input) transmit, to the external electronic device 102, information indicating that the user of the electronic device 101 is in a dangerous situation along with information about the position of the electronic device 101 using the communication module 190 (e.g., a cellular communication module). However, the disclosure is not limited thereto, and the processor 250 may transmit, to the external electronic device 102, information indicating that the user of the electronic device 101 is in a dangerous situation along with information about the position of the electronic device 101 using the communication module 190 (e.g., a cellular communication module) primarily on the basis of a user input, regardless of the operation in which the processor 250 determines that the user of the electronic device 101 is in a dangerous situation.

In an embodiment, as shown in FIG. 16A, the external electronic device 102 may display a mark 1611 indicating the current position of the electronic device 101 on the map 1610 and information 1620 indicating that the user of the electronic device 101 is in a dangerous situation and indicating the position of the electronic device 101 primarily on the basis of the information received from the electronic device 101.

Referring to FIG. 16B, in an embodiment, in response to the operation in which the processor 250 determines that the user of the electronic device 101 is in a dangerous situation or primarily on the basis of a user input, the processor 250 may transmit information about a request for help of the user of the electronic device 101 to the external electronic device 102 using the communication module 190 (e.g., a cellular communication module).

For example, the processor 250 may display a mark 1611 indicating the current position of the electronic device 101 and a mark 1633 indicating the position of an emergency service closest to the position of the electronic device 101 on the map 1630, and may display information 1640 for transmitting a request for help to the external electronic device 102 provided in the emergency service closest to the position of the electronic device 101 on the display 160. In response to reception of a user input to transmit the request for help from the user, the processor 250 may transmit the information related to the position of the electronic device 101 and the information related to the request for help to the external electronic device 102 using the communication module 190 (e.g., a cellular communication module).

Figure 17:
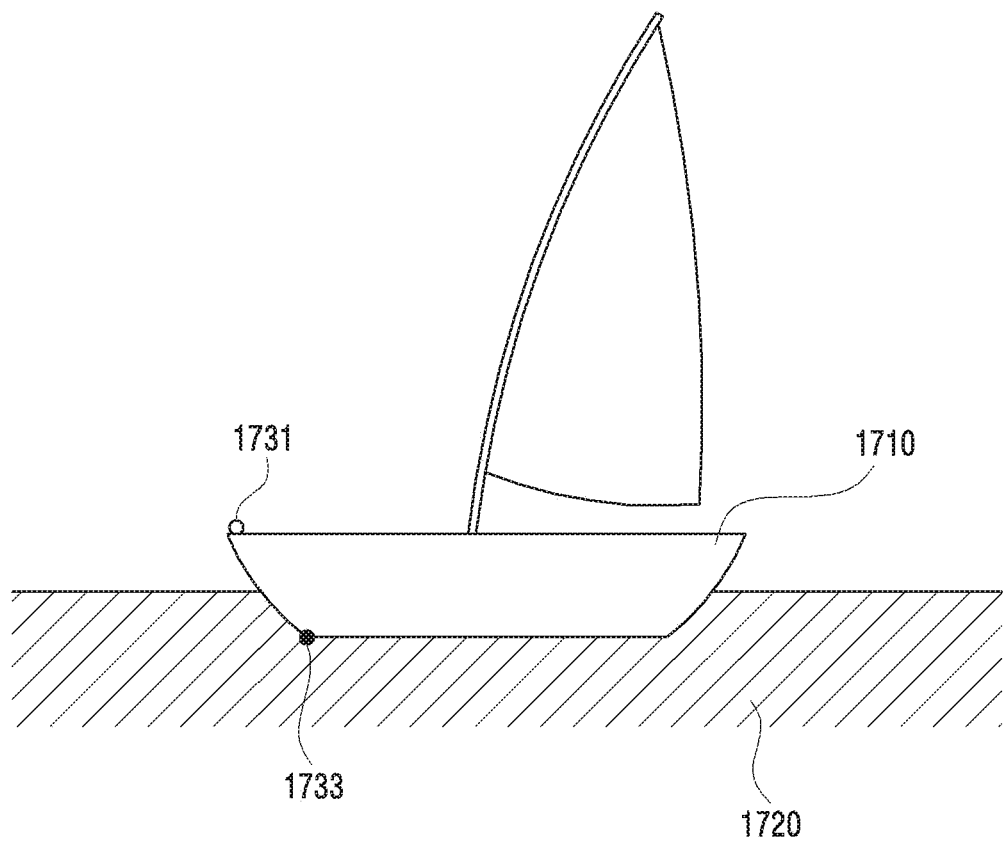
FIG. 17 is a diagram illustrating a method of providing the position of an electronic device in relation to water sports according to an embodiment of the disclosure.

FIG. 17 is a diagram illustrating a method for providing a position of an electronic device in connection with water sports according to an embodiment of the disclosure.

Referring to FIG. 17, in an embodiment, the electronic device 101 for measuring the position of the electronic device 101 may be disposed at a position 1731 of a boat, which is close to the water surface, in water sports such as a canoe, a yacht, or a kayak. The electronic device 101 may be immersed in water 1720 due to the influence of waves or the like during the water sports while the electronic device 101 is disposed at the position 1731 of the boat.

In an embodiment, if the electronic device 101 is immersed in water 1720, the electronic device 101 may adjust the resonant frequency of the antenna 220 (e.g., may configure a second antenna mode), thereby measuring the exact position of the boat including the electronic device 101.

In an embodiment, if the electronic device 101 is disposed at a position 1733 of the boat, which is submerged in water, while performing the water sports, the electronic device 101 may adjust the resonant frequency of the antenna 220 (e.g., may configure a first antenna mode), thereby measuring the exact position of the boat including the electronic device 101.

In an embodiment, during the water sports, the electronic device 101 may display the position of the electronic device 101 (or the position of the boat), records of the ongoing water sports, and the like to the user of the electronic device 101 (e.g., a player who engaged in water sports) using the display 160.

In an embodiment, during the water sports, the electronic device 101 may provide the exact position of the electronic device 101 (or the position of the boat 1710) to a spectator of the water sports (or an electronic device of the spectator) using the communication module 190 (e.g., a cellular communication module).

A method for providing the position of an electronic device and an electronic device supporting the same according to various embodiments may optimize a GNSS antenna in an outdoor swimming activity or underwater emergency situation, thereby improving sensitivity of a satellite signal and the accuracy of positioning of the electronic device.

A method according to various embodiments may include: identifying whether the electronic device is in water using a sensor; if the electronic device is not in water, adjusting a resonant frequency of an antenna to a first frequency band specified according to a first permittivity of air in relation to a specified frequency band for receiving satellites signals using a resonant frequency adjustment circuit configured to adjust the resonant frequency of the antenna; if the electronic device is in water, adjusting the resonant frequency of the antenna to a second frequency band specified according to a second permittivity of water in relation to the specified frequency band using the resonant frequency adjustment circuit; receiving the satellite signals through the antenna of which the resonant frequency has been adjusted to a frequency band corresponding to one of the first frequency band and the second frequency band using a positioning circuit; and determining a position of the electronic device primarily on the basis of the received satellite signals using the positioning circuit.

In various embodiments, the identifying whether the electronic device is in water using the sensor may include identifying whether the electronic device is in water primarily on the basis of data obtained from a first sensor that is included in the sensor and includes at least one of an atmospheric-pressure sensor, a touch-sensitive sensor, a humidity sensor, or an underwater sensor.

In various embodiments, the adjusting the resonant frequency to the first frequency band using the resonant frequency adjustment circuit may include selecting a first antenna corresponding to the first frequency band using a switch capable of selecting one of the first antenna and the second antenna, and the adjusting the resonant frequency to the second frequency band using the resonant frequency adjustment circuit may include selecting a second antenna corresponding to the second frequency band using the switch.

In various embodiments, the adjusting the resonant frequency to the first frequency band using the resonant frequency adjustment circuit may include selecting a first grounding point allowing the antenna to have a first length using a switch capable of selecting one of the first grounding point and a second grounding point, and the adjusting the resonant frequency to the second frequency band using the resonant frequency adjustment circuit may include selecting a second grounding point allowing the antenna to have a second length using the switch.

In various embodiments, the adjusting the resonant frequency to the first frequency band using the resonant frequency adjustment circuit may include selecting a first matching circuit, which is connected to the ground and has a first impedance, using a switch capable of selecting one of the first matching circuit and a second matching circuit, which is connected to the ground and has a second impedance, and the adjusting the resonant frequency to the second frequency band using the resonant frequency adjustment circuit may include selecting the second matching circuit using the switch.

In various embodiments, the method may further include: determining a swimming style of a user of the electronic device using a second sensor that is included in the sensor and is configured to generate data related to motion of the electronic device; if the determined swimming style is a first swimming style, continuously receiving the satellite signals for a specified period of time through the antenna of which the resonant frequency has been adjusted to the second frequency band; and if the determined swimming style is a second swimming style, receiving the satellite signals through the antenna of which the resonant frequency has been alternately adjusted to the first frequency band and the second frequency band.

In various embodiments, the method may further include: if the determined swimming style is the first swimming style, identifying whether the electronic device is in water every first specified period; and if the determined swimming style is the second swimming style, identifying whether the electronic device is in water every second specified period less than the first specified period.

In various embodiments, the method may further include determining the swimming style primarily on the basis of a user input.

In various embodiments, the method may further include: displaying information related to the determined position of the electronic device using a display of the electronic device; or transmitting information related to the determined position of the electronic device to an external device using a communication module of the electronic device.

In addition, a structure of the data used in the above-described embodiments may be recorded in a computer-readable recording medium by any of various means. The computer-readable recording medium may include a storage medium such as a magnetic storage medium (e.g., read-only memory (ROM), floppy disk, hard disk, or the like) or an optical readout medium (e.g., compact disc-ROM (CD-ROM), digital versatile disc (DVD), or the like).

In various embodiments, a computer-readable recording medium may record a program allowing an electronic device to perform operations of: identifying whether the electronic device is in water using a sensor; if the electronic device is not in water, adjusting a resonant frequency of an antenna to a first frequency band specified according to a first permittivity of air in relation to a specified frequency band for receiving satellites signals using a resonant frequency adjustment circuit configured to adjust the resonant frequency of the antenna; if the electronic device is in water, adjusting the resonant frequency of the antenna to a second frequency band specified according to a second permittivity of water in relation to the specified frequency band using the resonant frequency adjustment circuit; receiving the satellite signals through the antenna of which the resonant frequency has been adjusted to a frequency band corresponding to one of the first frequency band and the second frequency band using a positioning circuit; and determining a position of the electronic device primarily on the basis of the received satellite signals using the positioning circuit.

While the disclosure has been shown and described with reference to various embodiments thereof, it will be understood by those skilled in the art that various changes in forms and details may be made therein without departing from the spirit and scope of the disclosure as defined by the appended claims and their equivalents.

What is claimed is:

1. An electronic device comprising:
a sensor;
an antenna;
a positioning circuit configured to receive satellite signals through the antenna using a specified frequency band;
a resonant frequency adjustment circuit configured to adjust a resonant frequency of the antenna; and
a processor,
wherein the processor is configured to:
identify whether the electronic device is in water using the sensor;
when the electronic device is not in water, adjust the resonant frequency to a first frequency band specified according to a first permittivity of air in relation to the specified first frequency band using the resonant frequency adjustment circuit;
when the electronic device is in water, adjust the resonant frequency of the antenna to a second frequency band specified according to a second permittivity of water in relation to the specified second frequency band using the resonant frequency adjustment circuit;
receive the satellite signals through the antenna of which the resonant frequency has been adjusted to a frequency band corresponding to one of the first frequency band or the second frequency band using the positioning circuit; and
determine a position of the electronic device primarily on a basis of the received satellite signals using the positioning circuit.

2. The electronic device of claim 1,
wherein the sensor comprises a first sensor comprising at least one of an atmospheric-pressure sensor, a touch-sensitive sensor, a humidity sensor, or an underwater sensor, and
wherein the processor is further configured to identify whether the electronic device is in water primarily on a basis of data obtained from the first sensor.

3. The electronic device of claim 1,
wherein the antenna comprises a first antenna corresponding to the first frequency band and a second antenna corresponding to the second frequency band,
wherein the resonant frequency adjustment circuit comprises a switch capable of selecting one of the first antenna or the second antenna, and
wherein the processor is further configured to:
select the first antenna through the switch as at least a portion of the operation of adjusting the resonant frequency to the first frequency band; and
select the second antenna through the switch as at least a portion of the operation of adjusting the resonant frequency to the second frequency band.

4. The electronic device of claim 1,
wherein the antenna comprises a first grounding point allowing the antenna to have a first length and a second grounding point allowing the antenna to have a second length,
wherein the resonant frequency adjustment circuit comprises a switch capable of selecting one of the first grounding point or the second grounding point, and
wherein the processor is further configured to:
select the first grounding point through the switch as at least a portion of the operation of adjusting the resonant frequency to the first frequency band; and
select the second grounding point through the switch as at least a portion of the operation of adjusting the resonant frequency to the second frequency band.

5. The electronic device of claim 1,
wherein the resonant frequency adjustment circuit comprises a first matching circuit connected to a ground and having a first impedance, a second matching circuit connected to the ground and having a second impedance, and a switch capable of selecting one of the first matching circuit or the second matching circuit, and
wherein the processor is further configured to:
select the first matching circuit through the switch as at least a portion of the operation of adjusting the resonant frequency to the first frequency band; and
select the second matching circuit through the switch as at least a portion of the operation of adjusting the resonant frequency to the second frequency band.

6. The electronic device of claim 1,
wherein the sensor comprises a second sensor configured to generate data related to motion of the electronic device, and
wherein the processor is further configured to:
determine a swimming style of a user of the electronic device using the second sensor;
when the determined swimming style is a first swimming style, continue to receive the satellite signals for a specified period of time through the antenna of which the resonant frequency has been adjusted to the second frequency band; and
when the determined swimming style is a second swimming style, receive the satellite signals through the antenna of which the resonant frequency has been adjusted alternately to the first frequency band and the second frequency band.

7. The electronic device of claim 6, wherein the processor is further configured to:
when the determined swimming style is the first swimming style, identify whether the electronic device is in water every first specified period; and
when the determined swimming style is the second swimming style, identify whether the electronic device is in water every second specified period less than the first specified period.

8. The electronic device of claim 6, wherein the processor is further configured to determine the swimming style primarily on a basis of a user input.

9. The electronic device of claim 1, further comprising:
a display; and
a communication circuitry,
wherein the processor is further configured to display information related to the determined position of the electronic device using the display or is further configured to transmit information related to the determined position of the electronic device to an external device using the communication circuitry.

10. The electronic device of claim 1, wherein the antenna is configured as a part of a housing of the electronic device or is provided inside a display of the electronic device.

11. A method comprising:
identifying whether an electronic device is in water using a sensor;
when the electronic device is not in water, adjusting a resonant frequency of an antenna to a first frequency band specified according to a first permittivity of air in relation to a specified frequency band for receiving satellites signals using a resonant frequency adjustment circuit configured to adjust the resonant frequency of the antenna;
when the electronic device is in water, adjusting the resonant frequency of the antenna to a second frequency band specified according to a second permittivity of water in relation to the specified second frequency band using the resonant frequency adjustment circuit;
receiving the satellite signals through the antenna of which the resonant frequency has been adjusted to a frequency band corresponding to one of the first frequency band or the second frequency band using a positioning circuit; and
determining a position of the electronic device primarily on a basis of the received satellite signals using the positioning circuit.

12. The method of claim 11, wherein the identifying of whether the electronic device is in water using the sensor comprising identifying whether the electronic device is in water primarily on a basis of data obtained from a first sensor that is included in the sensor, the sensor comprising at least one of an atmospheric-pressure sensor, a touch-sensitive sensor, a humidity sensor, or an underwater sensor.

13. The method of claim 11,
wherein the adjusting of the resonant frequency to the first frequency band using the resonant frequency adjustment circuit comprises selecting a first antenna corresponding to the first frequency band using a switch capable of selecting one of the first antenna or a second antenna, and
wherein the adjusting of the resonant frequency to the second frequency band using the resonant frequency adjustment circuit comprises selecting a second antenna corresponding to the second frequency band using the switch.

14. The method of claim 11, wherein the adjusting of the resonant frequency to the first frequency band using the resonant frequency adjustment circuit comprises selecting a first grounding point allowing the antenna to have a first length using a switch capable of selecting one of the first grounding point or a second grounding point, and
wherein the adjusting of the resonant frequency to the second frequency band using the resonant frequency adjustment circuit further comprises selecting a second grounding point allowing the antenna to have a second length using the switch.

15. The method of claim 11, wherein the adjusting of the resonant frequency to the first frequency band using the resonant frequency adjustment circuit comprises selecting a first matching circuit, which is connected to a ground and has a first impedance, using a switch capable of selecting one of the first matching circuit or a second matching circuit, which is connected to the ground and has a second impedance, and
wherein the adjusting of the resonant frequency to the second frequency band using the resonant frequency adjustment circuit comprises selecting the second matching circuit using the switch.

16. The method of claim 11, further comprising:
determining a swimming style of a user of the electronic device using a second sensor that is included in the sensor and is configured to generate data related to motion of the electronic device;
when the determined swimming style is a first swimming style, continuously receiving the satellite signals for a specified period of time through the antenna of which the resonant frequency has been adjusted to the second frequency band; and
when the determined swimming style is a second swimming style, receiving the satellite signals through the antenna of which the resonant frequency has been alternately adjusted to the first frequency band and the second frequency band.

17. The method of claim 16, further comprising:
when the determined swimming style is the first swimming style, identifying whether the electronic device is in water every first specified period; and
when the determined swimming style is the second swimming style, identifying whether the electronic device is in water every second specified period less than the first specified period.

18. The method of claim 16, further comprising determining the swimming style primarily on a basis of a user input.

19. The method of claim 11, further comprising:
displaying information related to the determined position of the electronic device using a display of the electronic device; or
transmitting information related to the determined position of the electronic device to an external device using a communication circuitry of the electronic device.

20. A computer-readable recording medium having programs recorded therein, which are executable in a computer of an electronic device,
wherein the programs are configured to, when executed by the computer:
identify whether the electronic device is in water using a sensor,
when the electronic device is not in water, adjust a resonant frequency of an antenna to a first frequency band specified according to a first permittivity of air in relation to a specified frequency band for receiving satellites signals through a resonant frequency adjustment circuit configured to adjust the resonant frequency of the antenna,
when the electronic device is in water, adjust the resonant frequency of the antenna to a second frequency band specified according to a second permittivity of water in relation to the specified second frequency band through the resonant frequency adjustment circuit,
receive the satellite signals through the antenna of which the resonant frequency has been adjusted to a frequency band corresponding to one of the first frequency band or the second frequency band using a positioning circuit, and
determine a position of the electronic device primarily on a basis of the received satellite signals using the positioning circuit.

* * * * *